(12) United States Patent
Carnevali

(10) Patent No.: US 7,954,773 B2
(45) Date of Patent: Jun. 7, 2011

(54) UNIVERSALLY POSITIONABLE PLATFORM FOR BEVERAGE HOLDER

(76) Inventor: Jeffrey D. Carnevali, Seattle, WA (US)

( * ) Notice: Subject to any disclaimer, the term of this patent is extended or adjusted under 35 U.S.C. 154(b) by 635 days.

(21) Appl. No.: 12/005,838

(22) Filed: Dec. 28, 2007

(65) Prior Publication Data
US 2008/0111038 A1 May 15, 2008

Related U.S. Application Data

(63) Continuation-in-part of application No. 10/352,330, filed on Jan. 27, 2003, now Pat. No. 7,422,184.

(51) Int. Cl.
*F16M 13/00* (2006.01)
(52) U.S. Cl. ............... 248/160; 248/278.1; 248/314; 248/309.1; 224/544; 224/926; 220/737
(58) Field of Classification Search .......... 248/160, 248/311.2, 278.1, 314, 309.1, 288.31; 224/544, 224/926; 220/739, 737, 740; 206/486
See application file for complete search history.

(56) References Cited

U.S. PATENT DOCUMENTS

| | | | |
|---|---|---|---|
| 3,539,193 A * | 11/1970 | Parsons | ............................ 279/51 |
| 4,596,370 A | 6/1986 | Adkins | |
| 4,747,507 A | 5/1988 | Fitzgerald et al. | |
| 4,974,741 A | 12/1990 | Gustafson et al. | |
| 5,022,549 A | 6/1991 | Beaver | |
| 5,052,649 A | 10/1991 | Hunnicutt | |
| 5,088,673 A | 2/1992 | Chandler | |
| 5,123,558 A | 6/1992 | Maloney | |
| 5,135,195 A * | 8/1992 | Dane | .......................... 248/311.2 |
| 5,174,534 A | 12/1992 | Mitchell | |
| 5,180,088 A * | 1/1993 | de Angeli | ...................... 224/544 |
| 5,490,653 A | 2/1996 | Ingwersen | |
| 5,601,268 A | 2/1997 | Dunchock | |
| 5,651,523 A | 7/1997 | Bridges | |
| 5,655,742 A | 8/1997 | Whitman et al. | |
| 5,667,180 A | 9/1997 | Duckworth | |
| 5,743,504 A | 4/1998 | Miller | |
| 5,810,195 A | 9/1998 | Sim | |
| 5,839,711 A * | 11/1998 | Bieck et al. | .................... 248/313 |
| 5,845,885 A | 12/1998 | Carnevali | |
| 5,988,572 A | 11/1999 | Chivallier et al. | |
| 6,039,207 A | 3/2000 | Ademek | |
| 6,062,518 A | 5/2000 | Etue | |
| 6,089,519 A | 7/2000 | Laybourne | |
| 6,113,049 A | 9/2000 | Miljanich | |
| 6,397,046 B1 | 5/2002 | Kfoury | |
| 6,543,637 B1 | 4/2003 | Osborn | |
| 7,422,184 B2 * | 9/2008 | Carnevali | .................... 248/278.1 |

* cited by examiner

*Primary Examiner* — Anita King
(74) *Attorney, Agent, or Firm* — Charles J. Rupnick

(57) ABSTRACT

A positionable platform for use with a beverage holder, the positionable platform including a monolithic body sized similarly to a standard twelve (12) ounce beverage container, the body having an upper platform portion positioned adjacent to a first end of a wall portion thereof, with a plurality of slotted retention apertures distributed about the body and substantially aligned therewith. A resiliently pliable member resides in each of the slotted retention apertures, each of the resiliently pliable members being having a fin portion positioned partially within a slot portion and extended from the outer surface of the wall portion outwardly of the body and extending along the wall portion between the first and second ends thereof, and a spine portion positioned substantially within a recessed keyhole portion. A mounting platform is positioned adjacent to one of the first and second ends of the body.

22 Claims, 19 Drawing Sheets

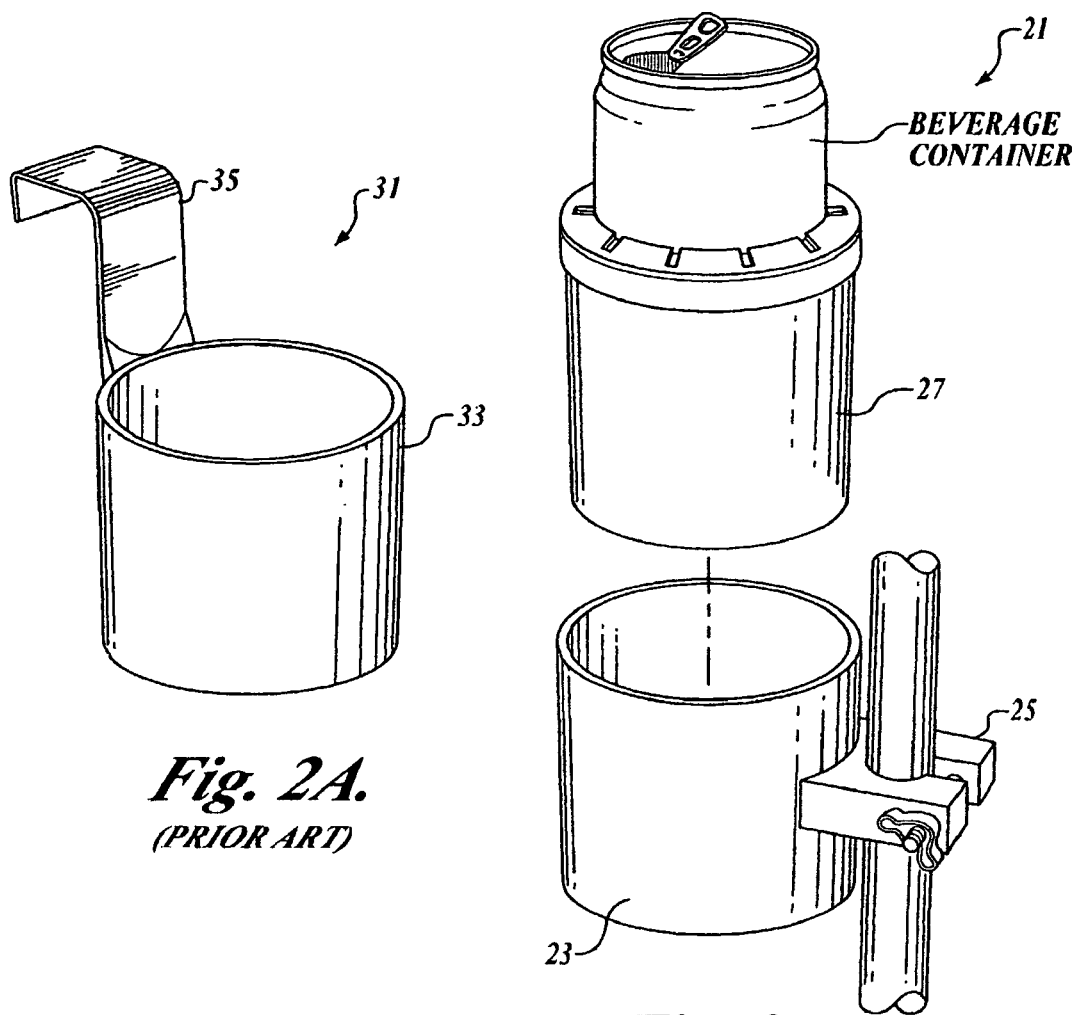
Fig. 2A.
(PRIOR ART)
Fig. 2B.
(PRIOR ART)
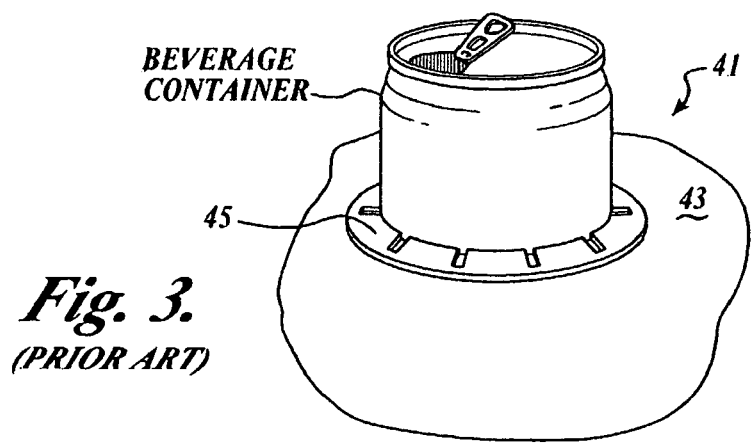
Fig. 3.
(PRIOR ART)

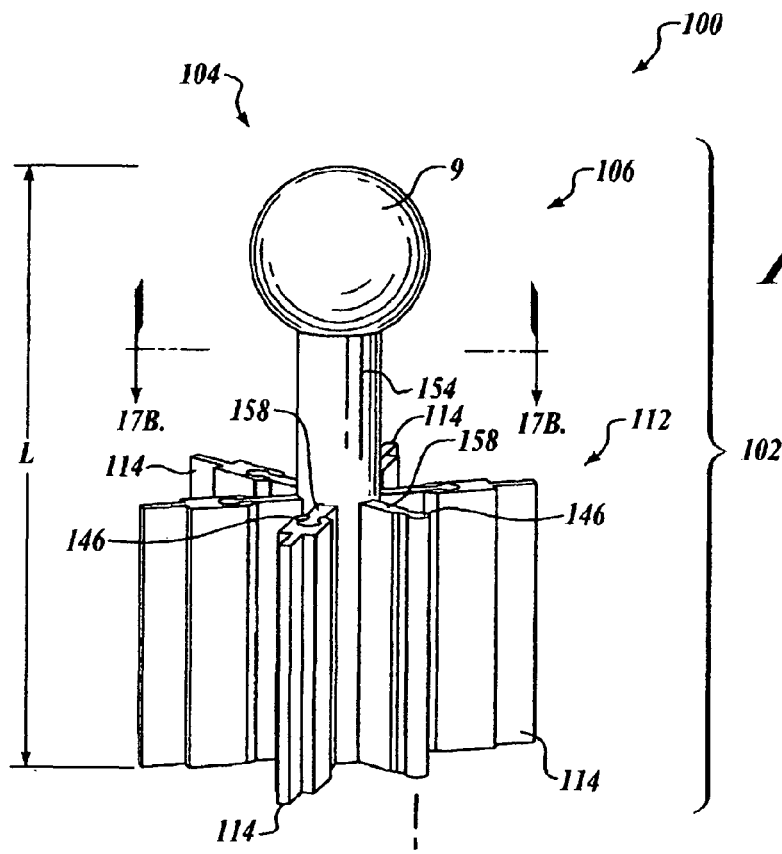
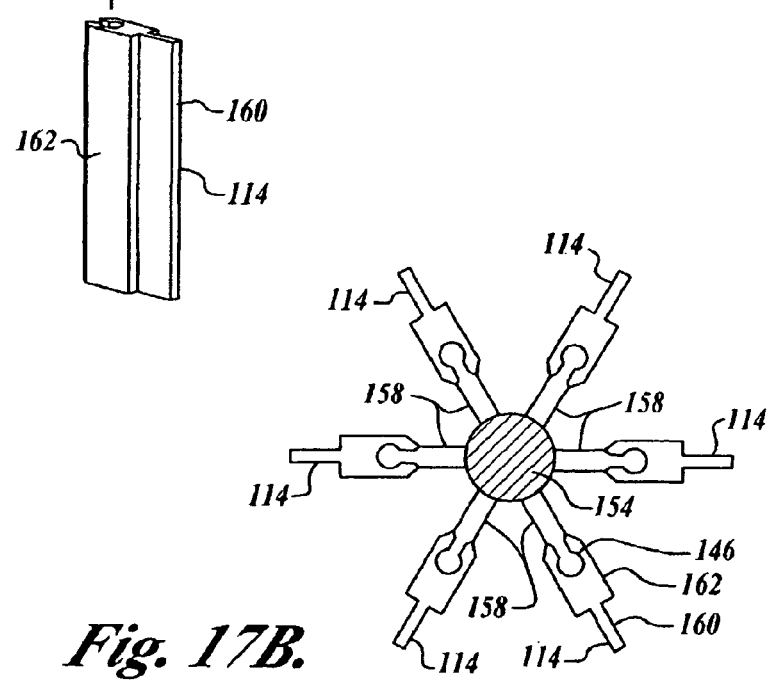
Fig. 17A.
Fig. 17B.

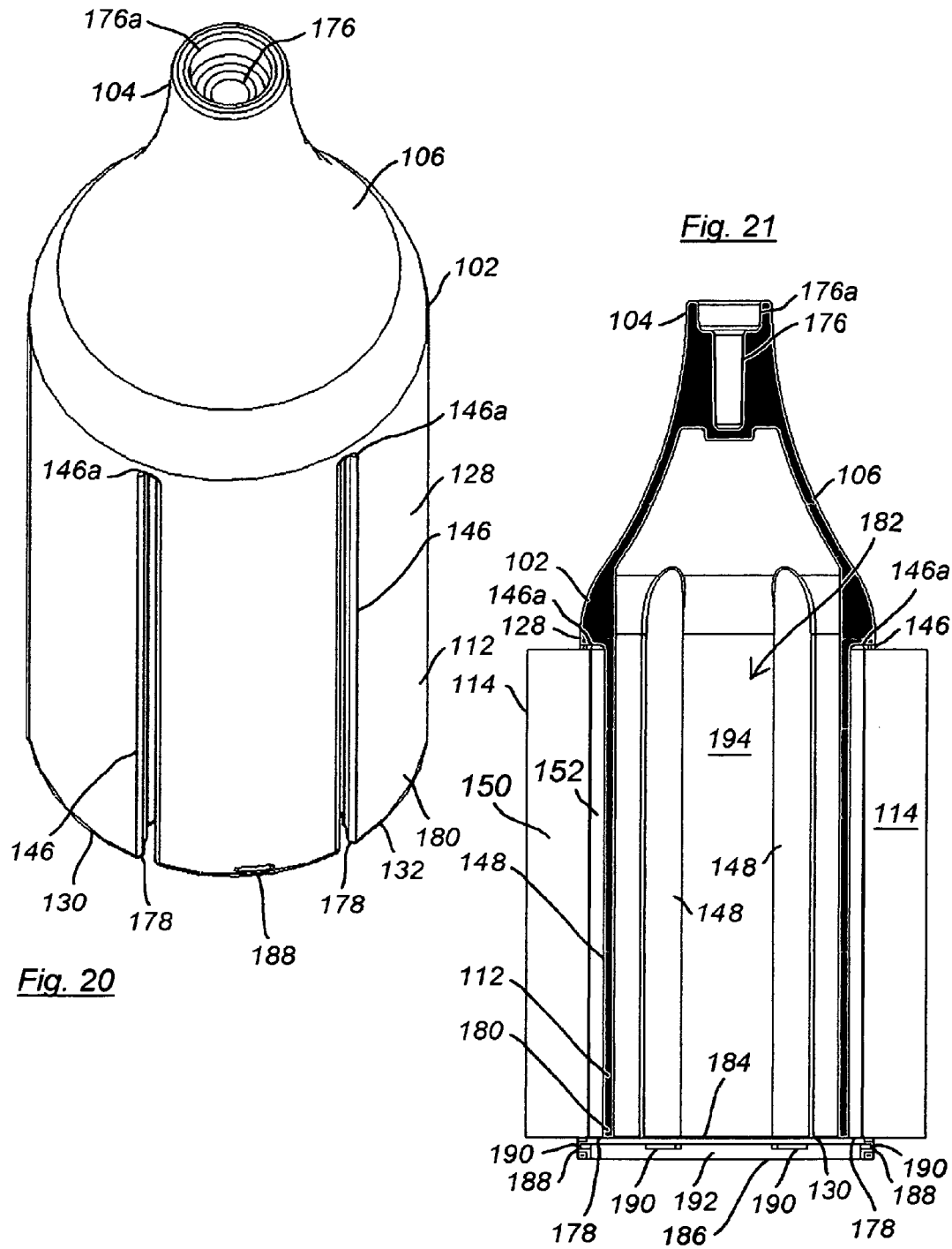

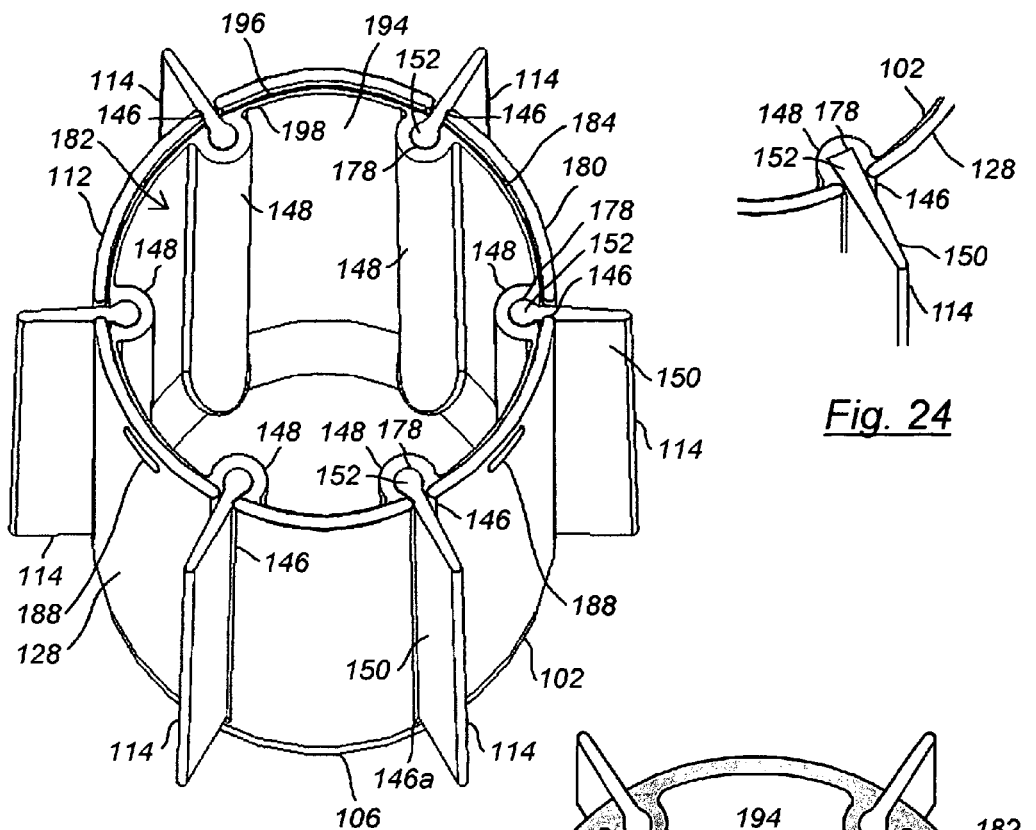
Fig. 22
Fig. 24
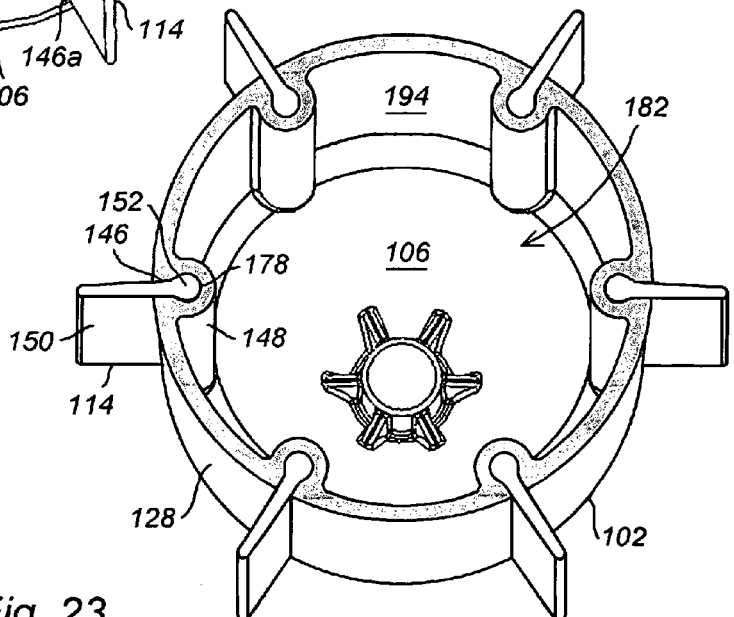
Fig. 23

UNIVERSALLY POSITIONABLE PLATFORM FOR BEVERAGE HOLDER

This application is a Continuation-in-part and claims priority benefit of parent U.S. patent application Ser. No. 10/352,330 filed in the name of Jeffrey D. Carnevali on Jan. 27, 2003 now U.S Pat. No. 7,422,184, the complete disclosure of which is incorporated herein by reference.

FIELD OF THE INVENTION

The present invention relates to mounting devices and methods, and in particular to positionable mounting platforms.

BACKGROUND OF THE INVENTION

Universal mounting devices are known for providing a positionable mounting platform in different air, land and marine vehicles. These positionable mounting platforms are typically structured to support a wide variety of mobile devices, such as cellular telephones, portable global positioning system (GPS) receivers, notebook computers, Personal Digital Accessories (PDAs) and other mobile devices. However, to date these positionable mounting platforms have been structured for permanent or semi-permanent mounting on a fixed surface of the vehicle for stability. FIG. 1, for example, illustrates one such universal mounting device 1 that provides positionable mounting platform 3. As shown here and described in U.S. Pat. No. 5,845,885, which is incorporated by reference herein in its entirety, universal mounting device 1 is founded on a base 5 that is secured to a fixed surface with a quantity of screws or other fasteners 7. A sphere 9 of resiliently compressible material is presented on a post 11 for access by a pair of clamping arms 13 that together form a socket that is positionally secured relative to the sphere 9 when a clamping mechanism 15 is tightened. The positionable mounting platform 3 is presented on a second sphere 17 of resiliently compressible material that is captured in a second socket formed at the opposite end of the clamping arms 13 and relatively positionally secured by increased tightening of the clamping mechanism 15. The positionable mounting platform 3 (shown without features) is optionally structured to support any of the above variety of mobile devices or another device or structure of the user's choice.

Portable beverage holders dedicated to a single use are also well-known. For example, portable holders are well-known for securely tending beverage containers of different sizes, such as liquid filled cans, glasses or bottles, in airplanes, automobiles or All Terrain Vehicles (ATVs), on boats, on bicycles or motorcycles, or other vehicles or conveyances where the beverage container is desired that be snugly maintained against adverse conditions.

FIGS. 2A and 2B both show examples of such portable beverage holders. Accordingly, FIG. 2B illustrates a portable beverage holder 21 for holding a standard twelve (12) ounce beverage can or bottle. The portable beverage holder 21 has a cup portion 23 with an integral clamping mechanism 25 whereby it is structured for mounting on a vertical rail or stem. Different variations of such portable beverage holders are structured for mounting on horizontal or diagonal rails. The user inserts a beverage container, such as a standard 12 ounce aluminum soda or beer can, in the cup 23 for hands-free operation of the vehicle or another activity. As shown here and described in U.S. Pat. No. 4,596,370, which is incorporated by reference herein in its entirety, the cup portion may be oversized for a standard 12 ounce can to permit a pocket of flexible insulating material 27 between the can and the cup.

FIG. 2A illustrates a more flexible portable beverage holder 31 having a cup portion 33 suspended from a hanger 35 for connecting the portable holder to window frames, chair backs or the like.

Other fixed-position beverage holders are also well-known, examples of which include cylindrical recesses sized or oversized to accept a beverage cup, mug, bottle, or beverage can, such as a common 12 ounce glass or plastic bottle or aluminum can. Such fixed-position cylindrical recess beverage holders are often molded into the center consoles, door handles and dashboards of automobiles. FIG. 3 illustrates one known fixed-position beverage holder 41 formed in a convenient surface 43 and configured with a quantity of flexible fingers 45 structured to accept a standard 12 ounce can or bottle and hold it securely.

SUMMARY OF THE INVENTION

The present invention is a positionable platform for use with a conventional beverage holder that overcomes limitations of the prior art. The universally positionable platform of the invention a first end sized to fit within a conventional beverage holder and being structured with one or more resiliently pliable members structured to interfere with an internal wall surface of the beverage holder, and a second end coupled to the first end and being structured with a mechanical mounting platform.

According to one aspect of the invention, the invention is a universally positionable platform for use with a beverage holder structured to accept and securely tend a standard 12 ounce can or bottle, the universally positionable platform being formed of a substantially cylindrical base portion structured for secure insertion into a beverage holder structured to accept and securely tend a standard 12 ounce beverage container; and a mounting portion coupled to the base portion and being structured with a mechanical mounting means. The base and mounting portions of the positionable platform are both formed of a substantially rigid material and are coupled in a single integral unit. The coupled base and mounting portions are sized similarly to a standard 12 ounce beverage container.

According to another aspect of the invention, the first and second ends of the positionable platform are structured for secure attachment to opposing ends of a conventional beverage container, whereby the second end is coupled to the first end through the beverage container.

According to another aspect of the invention, the first end of the positionable platform is structured of a substantially flexible material.

According to another aspect of the invention, the second end of the positionable platform is structured of a substantially rigid material.

According to another aspect of the invention, one or both of the first and second ends of the positionable platform is further structured to space the mechanical mounting platform of the second end outside of the beverage holder.

According to another aspect of the invention, the mechanical mounting platform of the positionable platform includes a pair of spaced apart mounting holes formed in the second end.

According to another aspect of the invention, the positionable platform for use with a conventional beverage holder includes a substantially rigid monolithic body sized similarly to a standard twelve (12) ounce beverage container, the body formed of an upper platform portion positioned adjacent to a first end of a wall portion thereof, and the wall portion being formed with a plurality of slotted retention apertures substantially uniformly distributed there about and substantially longitudinally aligned therewith between an opening thereinto adjacent to the first end thereof and a closure positioned adjacent to an opposite second end thereof and having a slot portion communicating between an outer surface of the wall portion and a recessed keyhole portion. A resiliently pliable member is resident in each of the plurality of slotted retention apertures, each of the resiliently pliable members being formed of a fin portion thereof positioned partially within the slot portion and extended from the outer surface of the wall portion outwardly of the body and extending along the wall portion between the first and second ends thereof, and a spine portion substantially contiguous with the fin portion and positioned substantially within the recessed keyhole portion. A mounting platform is positioned adjacent to one of the first and second ends of the body.

According to another aspect of the invention, the monolithic body is formed with an interior cavity partially bounded by the wall portion and having an opening thereinto adjacent to a different one of the first and second ends of the body opposite from the mounting platform.

According to another aspect of the invention, the positionable platform further includes a cover attached to the opening into the interior cavity of the body, the cover further covering at least a portion of the opening into each of the slotted retention apertures.

According to another aspect of the invention, the positionable platform further includes a weight secured within the interior cavity of the body.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A and 2B show examples of known portable beverage holders, wherein FIG. 2B illustrates a portable beverage holder having an integral clamping mechanism whereby it is structured for mounting on a vertical rail or stem, and FIG. 2A illustrates a more flexible portable beverage holder having a cup portion suspended from a hanger for connecting the portable holder to window frames, chair backs or the like;

FIG. 3 illustrates one example of a known fixed-position beverage holder;

FIGS. 5 and 6 further illustrate the embodiment of the universally positionable platform of the invention as illustrated in FIG. 4, wherein FIG. 5 is a cut-away prospective view of the universally positionable platform of the invention and FIG. 6 is a cross-section view of the universally positionable platform of the invention;

FIGS. 9, 10 and 11 each illustrates the cup-shaped lower insertion portion of the universally positionable platform of the invention according to a different alternative embodiment of the invention, wherein the one or more flexible or pliable members are embodied as one or more substantially concentric and co-parallel radially outwardly projecting fins, wherein FIG. 9 illustrates one embodiment of the flexible or pliable members being structured as a quantity of substantially concentric and radially outwardly projecting co-parallel fins, FIG. 10 illustrates one embodiment of the flexible or pliable members being structured as one or more substantially concentric and co-parallel radially outward projecting fins that are divided into spaced apart segments, and FIG. 11 illustrates one embodiment of the flexible or pliable members being structured as a single radially outwardly projecting fin formed adjacent to the base of the cup-shaped lower insertion portion;

FIGS. 14A and 14B together illustrate another alternative embodiment of the positionable platform of the invention, wherein FIG. 14A is a perspective assembly view of the universally positionable platform of the invention, and FIG. 14B is a bottom view of the universally positionable platform of the invention;

FIGS. 15A and 15B together illustrate another embodiment of the positionable platform of the invention, wherein FIG. 15A is a perspective assembly view of the universally positionable platform of the invention, and FIG. 15B is a cross-section view of the universally positionable platform of the invention;

FIGS. 17A and 17B together illustrate still another embodiment of the positionable platform of the invention, wherein FIG. 17A is a perspective assembly view of the universally positionable platform of the invention, and FIG. 17B is a cross-section view of the universally positionable platform of the invention;

FIG. 20 is a perspective view of the monolithic body of the positionable platform with the flexible support arm and pliable members removed for clarity;

FIG. 21 is a longitudinal cross-section view of the monolithic body of the positionable platform showing the mounting platform of the upper platform portion having a cylindrical recess for receiving thereinto the flexible support arm or another support apparatus;

FIG. 22 is perspective view of the generally cylindrical body of the positionable platform with a bottom cover plate removed for clarity;

FIG. 23 is a cross-section through the generally cylindrical body of the positionable platform that more clearly illustrates male retaining feature of respective pliable members being seated in keyhole-shaped mouth openings of respective keyhole apertures, with a pliable fin portion filling and extending radially outwardly of the cylindrical body wall from female slots;

FIG. 24 illustrates another embodiment of the female retaining feature of respective keyhole retention apertures wherein the retaining feature is a wedge shaped keyhole;

DETAILED DESCRIPTION OF PREFERRED EMBODIMENT

In the Figures, like numerals indicate like elements.

The present invention is an apparatus and method for a universally positionable platform for use with a conventional beverage holder, the universally positionable platform including a bottom or lower end sized or undersized to fit within a conventional beverage holder, and a top end structured with a mechanical mounting platform to accept a mechanical connector thereto. According to at least one embodiment of the invention, the undersized bottom or lower end is structured with one or more resiliently pliable members intended to interfere with an internal wall surface of the beverage holder.

Figure 4:
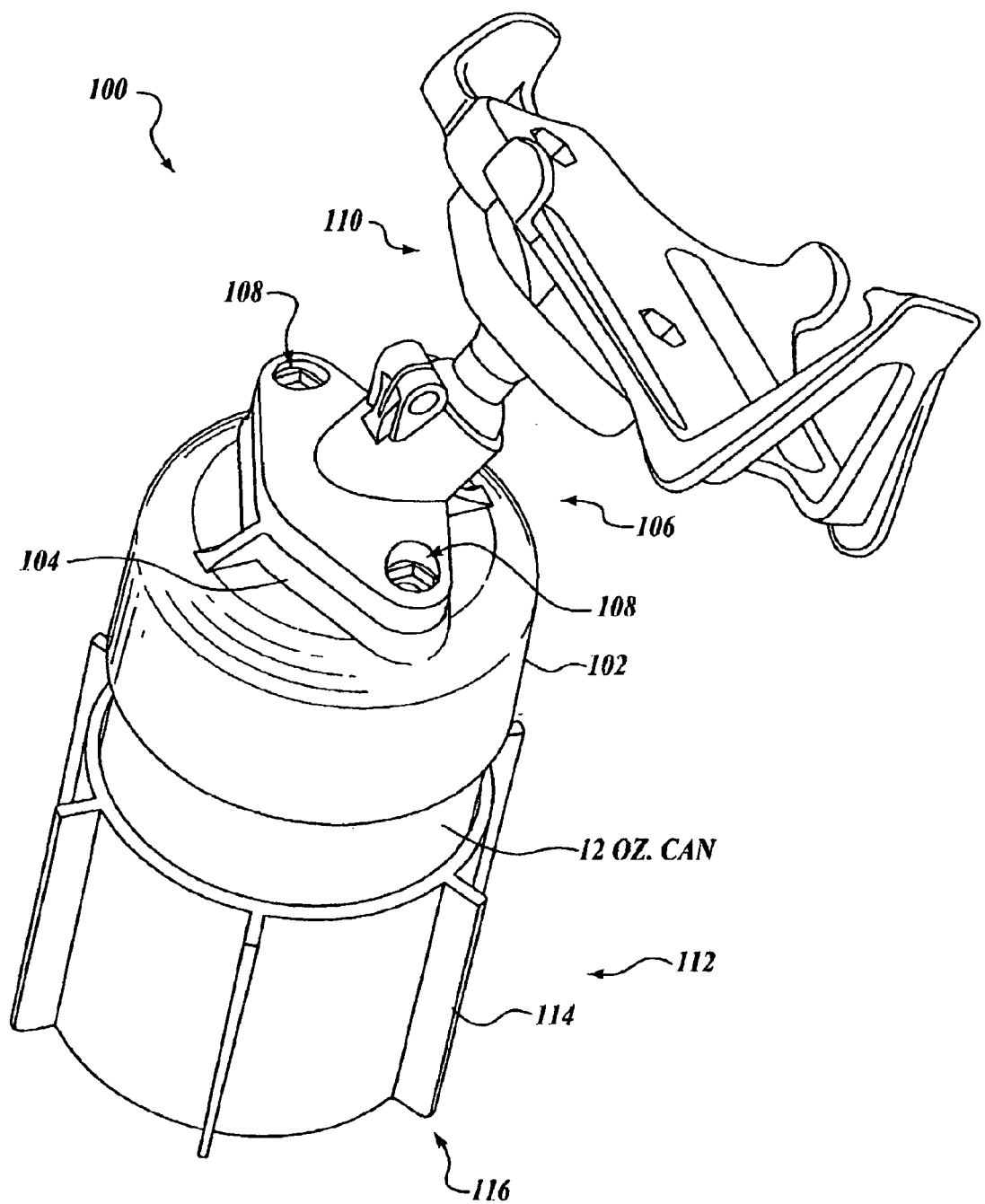
FIG. 4 illustrates one embodiment of the universally positionable platform of the invention as a cup-shaped mounting platform secured to one end of a conventional 12 ounce metal beverage can and a cup-shaped lower insertion portion secured to the other end of the beverage can, the lower insertion portion being structured for secure insertion into any one of the many different types of generally well-known portable and fixed-position beverage holders.

FIG. 4 illustrates the universally positionable platform 100 of the invention as a generally cylindrical body 102 sized approximately the same as or slightly larger than a conventional twelve (12) ounce hollow glass or plastic bottle or metal beverage can. That is to say, about two and one-half inches (2½") or more in diameter by about four and three-quarters to five inches (4¾" to 5") more or less in length. The universally positionable platform 100 of the invention, as embodied in FIG. 4, includes a mounting platform 104 positioned at a first or upper platform portion 106. The mounting platform 104 is structured, for example, as a substantially rigid pedestal having a pair of spaced apart holes 108 (shown more clearly in subsequent figures) for mounting one or another known device platform 110, such as a spring-loaded cradle structured to accept a small, normally portable electronics device 101 such as a cell phone, personal digital assistant (PDA) or hand-held global positioning system (GPS) receiver or another such device. One such device platform is by example and without limitation the universally positionable ball-and-socket mounting device shown, which is commercially available from National Products, Incorporated of Seattle, Wash., USA.

The first or upper platform portion 106 of the generally cylindrical body 102 having the mounting platform 104 positioned thereon projects from or above a second or lower insertion portion 112 that is structured for being securely inserted into any one of the many different types of generally well-known portable and fixed-position beverage holders, such as but not limited to those portable and fixed-position beverage holders discussed herein and commonly found in or for use with many different vehicles. Thus, according to the embodiment of the invention disclosed in FIG. 4, the second or lower insertion portion 112 of the generally cylindrical body 102 is sized to enter any one of many different portable and fixed-position cylindrical-bore beverage holders. Furthermore, the lower insertion portion 112 of the cylindrical body 102 is structured with one or more resiliently pliable members 114 sized to compress during entry into the internal bore of the beverage holder and to subsequently interfere with an internal wall surface of the beverage holder, thereby effectively securing the lower insertion portion 112 of the cylindrical body 102 within the beverage holder against loads applied at the mounting platform 104 portion of the upper platform portion 106. Upon removal from the beverage container, the pliable members 114 resiliently straighten and are once oriented for insertion into the same or another beverage holder.

The pliable members 114 are, by example and without limitation, a quantity of thin flexible fins of a resiliently flexible or pliable material projecting substantially at right angles from a surface of the lower insertion portion 112 of the cylindrical body 102. When the flexible or pliable members 114 are embodied as fins, the lower insertion portion 112 is injection molded or otherwise formed of a resiliently flexible or pliable material such as but not limited to a resiliently flexible or pliable plastic, a rubber, or another resiliently flexible or pliable material capable of forming resiliently compressible fins of the type described here.

When embodied as fins, the flexible or pliable members 114 optionally include a lead-in feature 116, such as a chamfer (shown) or radius, whereby the lower insertion portion 112 of the cylindrical body 102 is easily started into the bore of the beverage holder. The lead-in feature 116 also acts to encourage flexure or collapse of the individual pliable members 114 during entry into the bore of the beverage holder.

As illustrated in subsequent Figures, the universally positionable platform of the invention for use with a conventional beverage holder is realized according to any of a large number of different embodiments. The opposing upper platform and lower insertion portions 106, 112 of the body 102 and the mounting platform 104 are realized in different forms, and the different forms of the platform and insertion portions 106, 112 and the mounting platform 104 are realized in different combinations.

Figure 5:
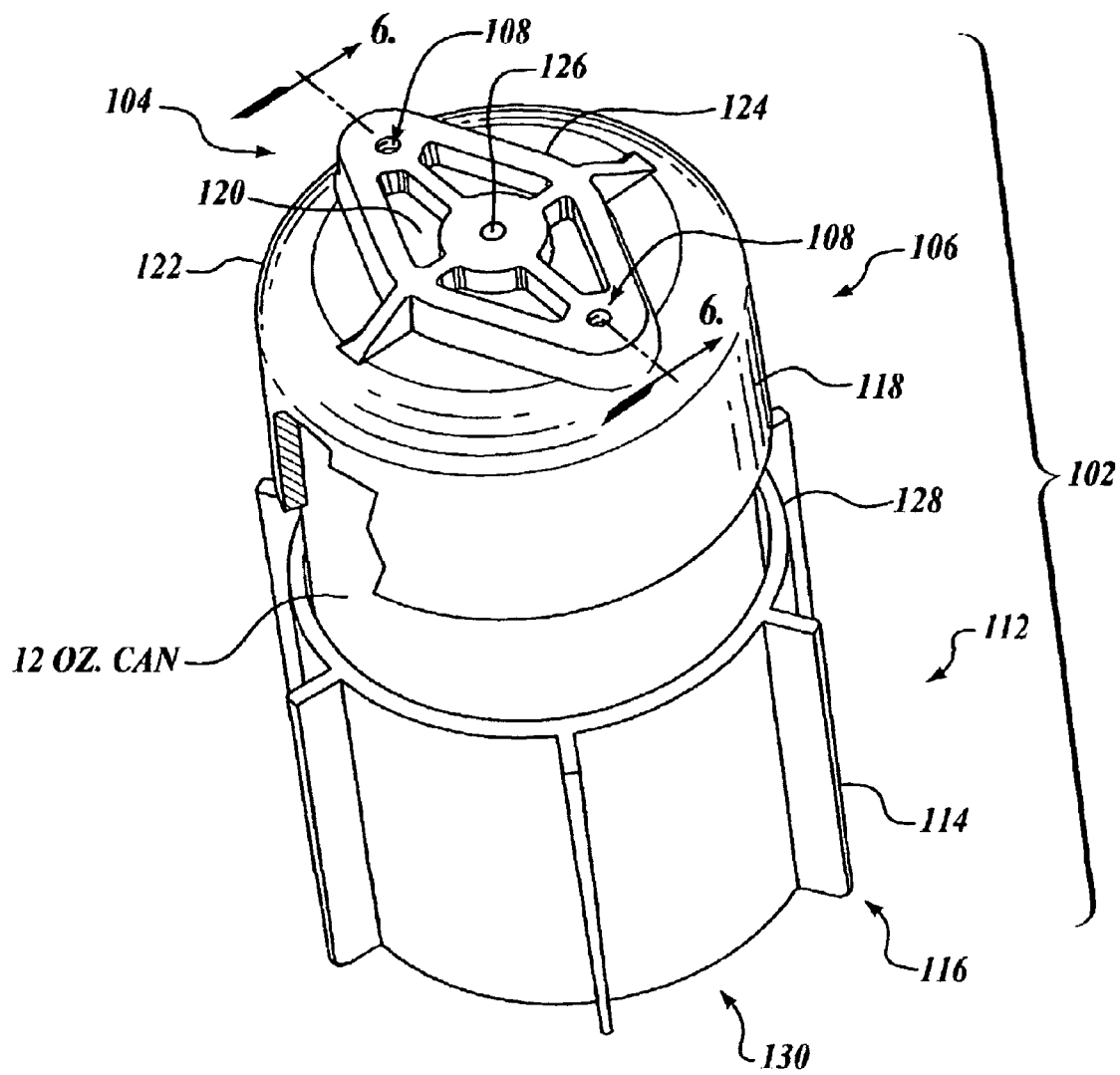
Figure 6:
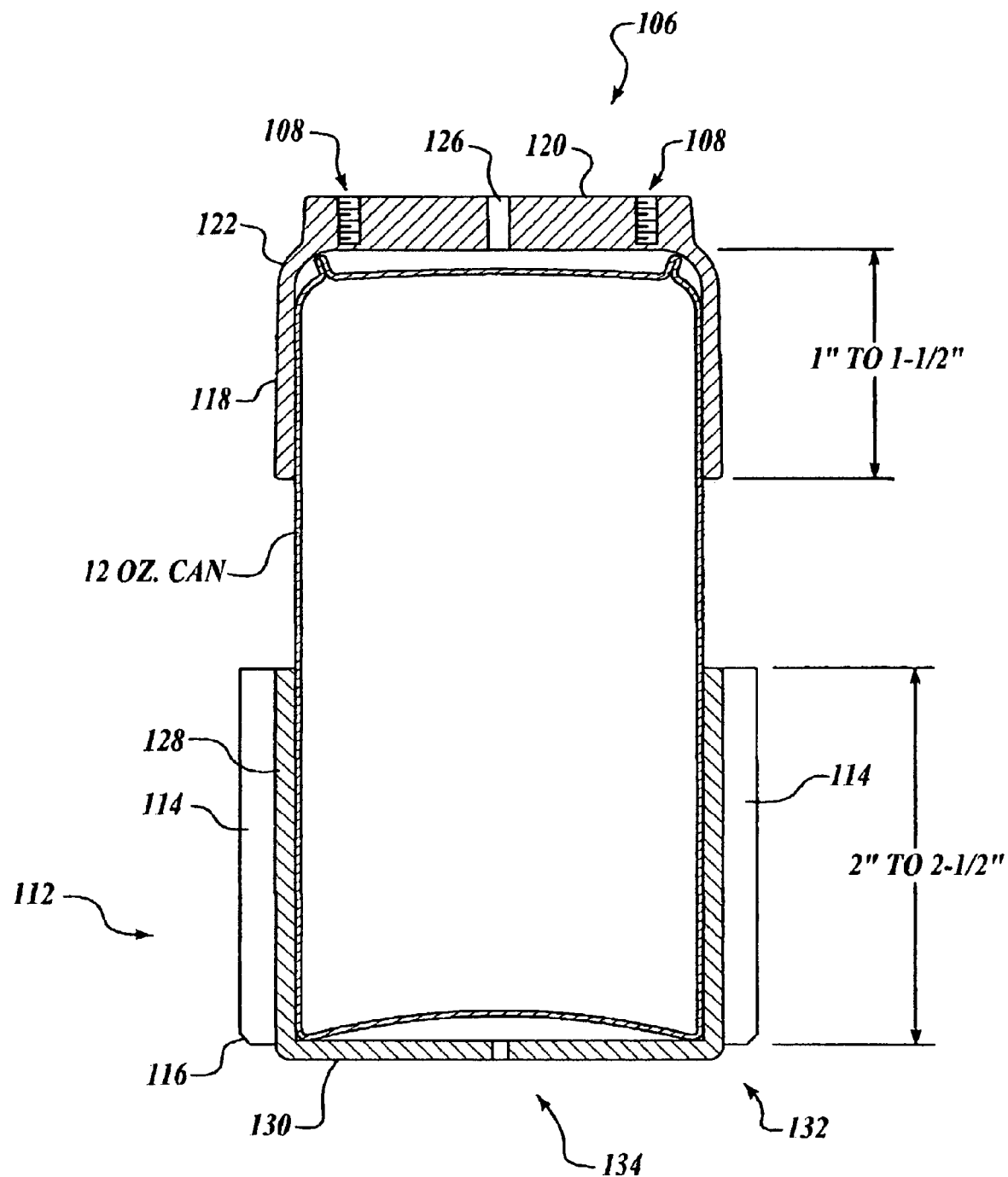

FIGS. 5 and 6 better illustrate the embodiment of the first or upper platform portion 106 of the generally cylindrical body 102 of the positionable platform 100 of the invention as illustrated in FIG. 4 with the device platform 110 removed for clarity, wherein FIG. 5 is a cut-away prospective view and FIG. 6 is a cross-section view. Accordingly, the upper platform portion 106 of the generally cylindrical body 102 is formed in the shape of a cup using a relatively rigid material, such as but not limited to a hard plastic, epoxy resin, or metal. When formed of a hard plastic, the upper platform portion 106 is optionally injection molded for ease of manufacturing. The integral cup shape includes a substantially cylindrical wall portion 118 ending in a substantially solid base portion 120. Optionally, the cylindrical wall and base portions 118, 120 intersect at a curving joint 122 formed, by example and without limitation, with external round and corresponding internal fillet shapes. The cylindrical wall portion 118 of the cup-shaped upper platform portion 106 of the present embodiment encompasses an internal space sized to fit snugly over a first or top end of a common beverage container of the twelve (12) ounce aluminum can type to a degree that it is held snugly against externally applied forces. For example, the cup-shaped upper platform portion 106 encompasses the beverage container for a distance in the range of about one to one and one-half inch (1" to 1¼"), or about one and one-quarter inch (1¼").

The base portion 120 of the cup-shaped upper platform portion 106 is configured with the mounting platform 104 embodied as the pair of spaced apart holes 108 configured as clearance holes for screws or other fasteners, as shown in FIG. 5, or as threaded holes having the threads formed directly in the material of the base portion 120 or as a threaded insert (shown left to right). The base portion 120 is optionally embossed with a pattern of stiffeners 124 for reinforcing the base portion 120. Additionally, the base portion 120 may include a breather or exhaust hole 126 wherefrom air otherwise trapped between the beverage can and the base portion 120 is expelled from the cup-shaped upper platform portion 106.

FIGS. 5 and 6 also show respective perspective and cross-section views of the second or lower insertion portion 112 of the generally cylindrical body 102, which is sized to enter any one of many different portable and fixed-position cylindrical-bore beverage holders. The second or lower insertion portion 112 of the generally cylindrical body 102 is formed in the shape of a cup using a relatively flexible material, such as but not limited to a soft plastic or rubber. The integral cup shape includes a substantially cylindrical wall portion 128 ending in a substantially solid base portion 130. Optionally, the cylindrical wall and base portions 128, 130 intersect at a curving joint 132 formed, by example and without limitation, with external round and corresponding internal fillet shapes.

The quantity of flexible or pliable members 114 are embodied as fins formed on the external wall surfaces 128 and may extend over any part of the external wall surfaces 128 or over the entire length thereof.

The cylindrical wall portion 128 of the cup-shaped lower insertion portion 112 of the present embodiment encompasses an internal space sized to fit snugly over a second or bottom end of the common 12 ounce aluminum beverage container to a degree that it is held snugly against forces applied externally to the beverage container. For example, the cup-shaped lower insertion portion 112 encompasses the bottom end of the beverage container for a distance in the range of about two to two and one-half inch (2" to 2¼"), or about two and one-quarter inch (2¼").

The base portion 130 may optionally include a breather or exhaust hole 134 wherefrom air otherwise trapped between the beverage can and the base portion 130 is expelled from the cup-shaped lower insertion portion 112.

Figure 7:
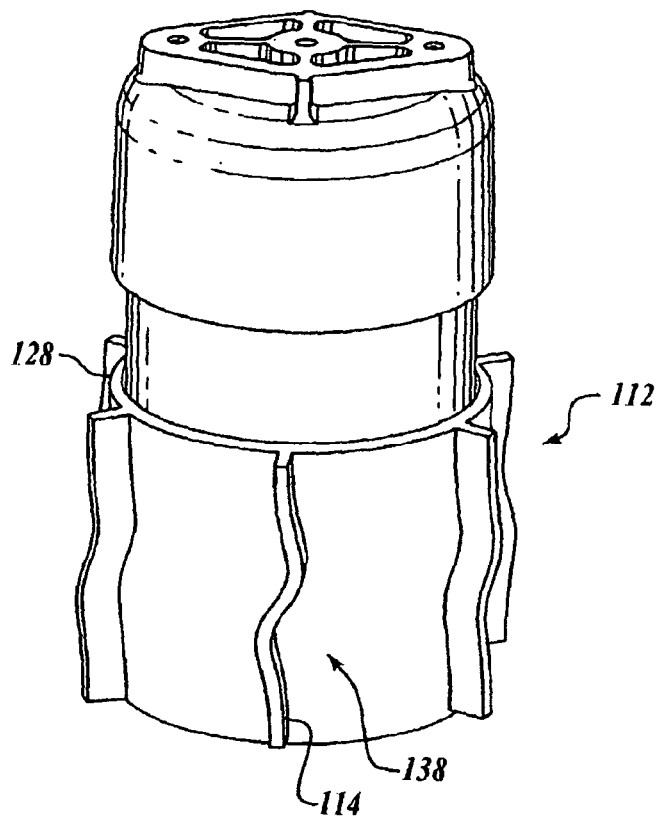
FIG. 7 illustrates the cup-shaped lower insertion portion of the universally positionable platform of the invention according to an alternative embodiment of the invention, wherein the one or more flexible or pliable members are embodied as fins having a "wave" formed therein.

FIG. 7 illustrates the cup-shaped lower insertion portion 112 according to an alternative embodiment of the invention, wherein the one or more flexible or pliable members 114 are structured as fins having a "wave" 138 formed therein, in contrast to the substantially straight fin-shaped embodiments of the flexible or pliable members 114 shown in other figures.

Figure 8:
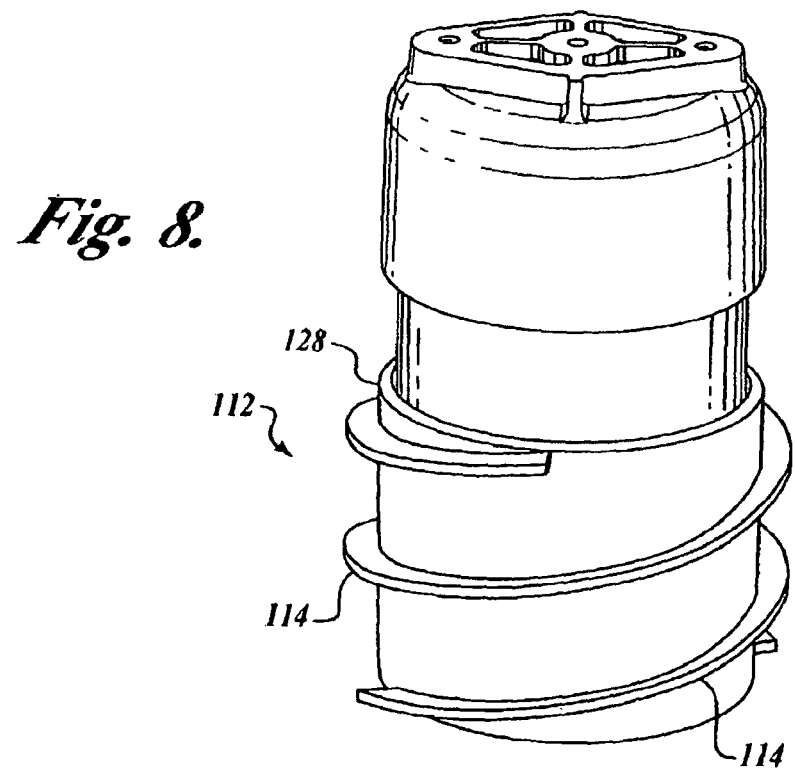
FIG. 8 illustrates the cup-shaped lower insertion portion of the universally positionable platform of the invention according to another alternative embodiment of the invention, wherein the one or more flexible or pliable members are embodied as one or more radially outwardly projecting spiral fins.

FIG. 8 illustrates the cup-shaped lower insertion portion 112 according to an alternative embodiment of the invention, wherein the one or more flexible or pliable members 114 are structured as one or more spiral fins projecting radially outward from the wall portion 128. Optionally, the one or more spiral fins are formed with a gradually decreasing radial extent from a maximum radial extent at the upper end of the wall portion 128 distal from the base portion 130 to a minimum radial extent upon approaching the wall portion 128 adjacent to the base portion 130.

Figure 9:
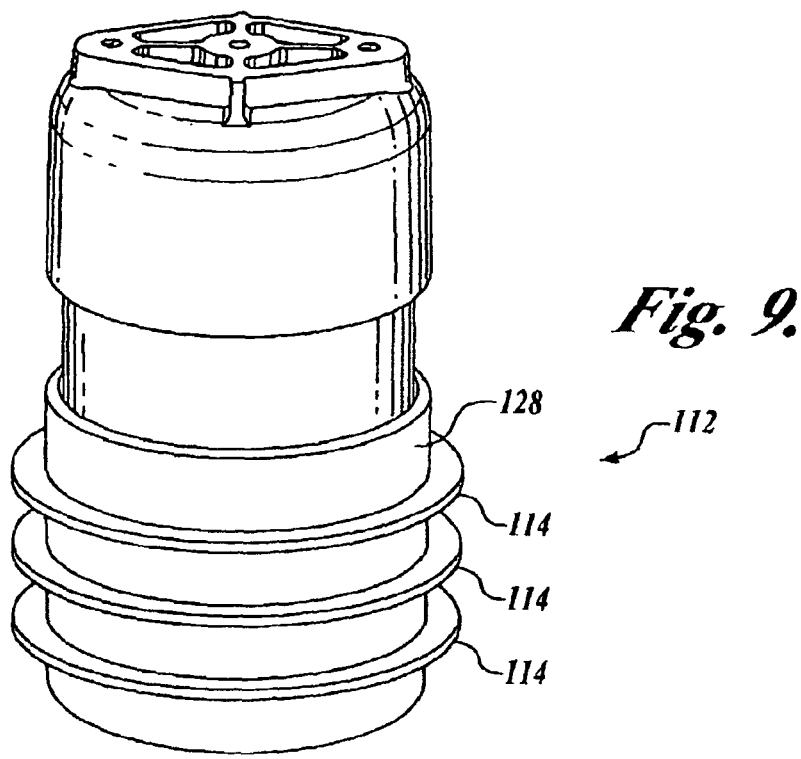
Figure 10:
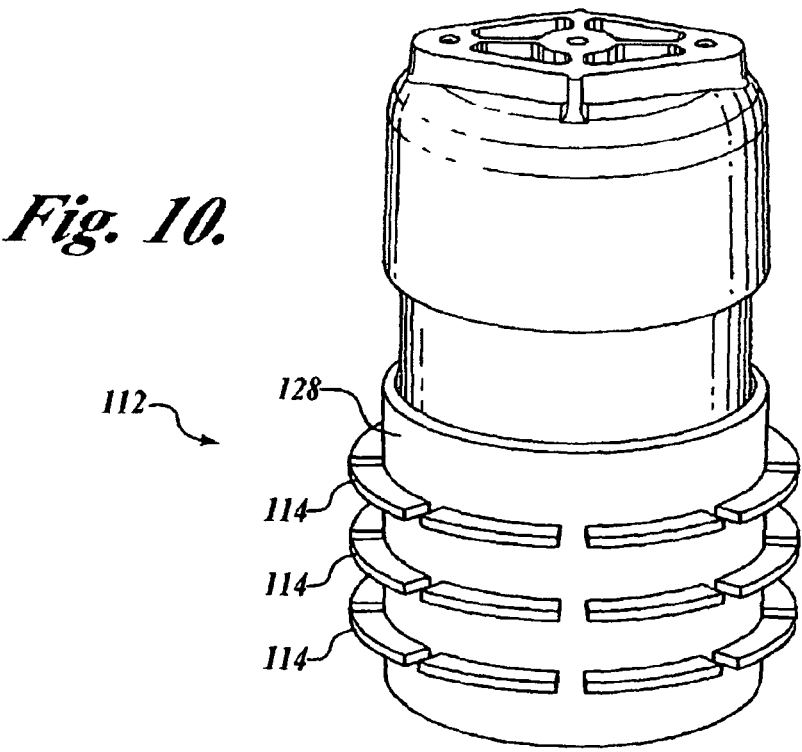
Figure 11:
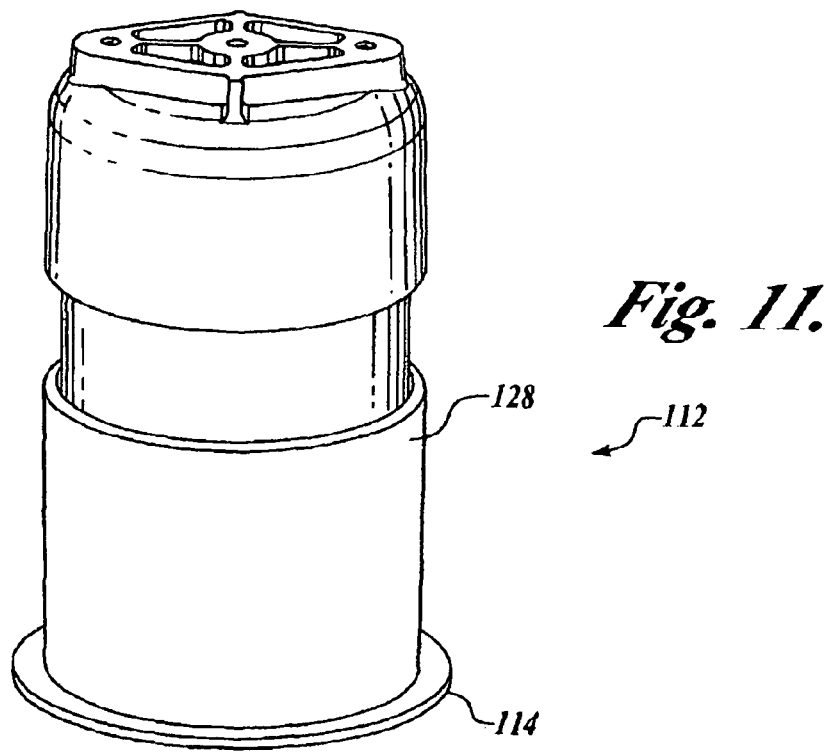

FIGS. 9, 10 and 11 each illustrates the cup-shaped lower insertion portion 112 according to a different alternative embodiment of the invention, wherein the one or more flexible or pliable members 114 are structured as one or more substantially concentric and co-parallel fins projecting radially outward from the wall portion 128. FIG. 9 illustrates one embodiment of the flexible or pliable members 114 being structured as a quantity of substantially concentric and radially outwardly projecting co-parallel fins. Optionally, the diameters of successive concentric fins are formed with a gradually decreasing radial extent from a fin at the upper end of the wall portion 128 distal from the base portion 130 having a maximum radial extent to a subsequent fin adjacent to the base portion 130 having a minimum radial extent.

According to the embodiment illustrated in FIG. 10, the one or more flexible or pliable members 114 structured as one or more substantially concentric and co-parallel radially outward projecting fins are divided into segments and spaced apart, the length of all of the segments of each concentric fin being less than the outer circumference of the cup-shaped insertion portion 112. Furthermore, the diameters of successive concentric segmented fins are formed with a gradually decreasing radial extent from a segmented fin at the upper end of the wall portion 128 distal from the base portion 130 having a maximum radial extent to a subsequent segmented fin adjacent to the base portion 130 having a minimum radial extent.

FIG. 11 illustrates the one or more flexible or pliable members 114 embodied as yet another alternative of the substantially concentric and co-parallel radially outward projecting fins wherein the one or more flexible or pliable members 114 is embodied as a single outward projecting fin formed concentric with the wall portion 128 adjacent to the base portion 130. Optionally, the single outward projecting fin is curved or inclined downwardly away from the base portion 130.

Figure 12:
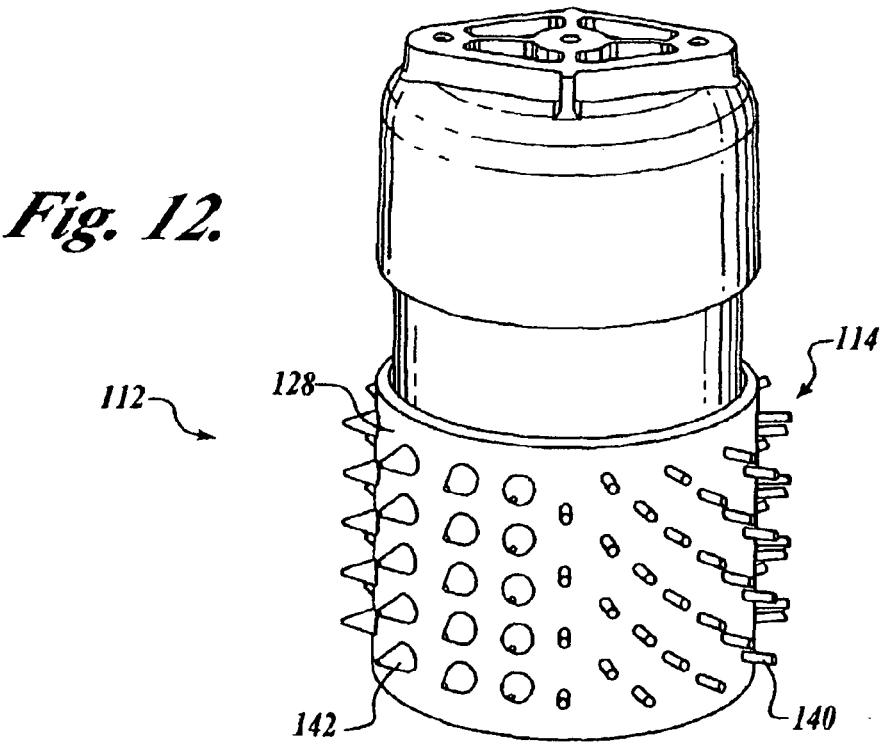
FIG. 12 illustrates the cup-shaped lower insertion portion of the universally positionable platform of the invention according to another alternative embodiment of the invention, wherein the one or more flexible or pliable members are embodied as one of both radially outwardly projecting cilia and radially outwardly projecting conical knobs.

FIG. 12 illustrates by example and without limitation the one or more flexible or pliable members 114 embodied as a quantity of cilia 140 projecting radially outwardly from the external surface of the wall portion 128. The cilia 140 are formed, by example and without limitation, by injection molding of the resiliently flexible or pliable plastic, a rubber, or another resiliently flexible or pliable material used in forming the cup-shaped lower insertion portion 112. The cilia 140 are structured to resiliently flex during entry into the internal bore of the beverage holder and to subsequently press outwardly from the wall portion 128 to interfere with an internal wall surface of the beverage holder. The flexible or pliable members 114 embodied as a quantity of cilia 140 thereby effectively secure the lower insertion portion 112 of the cylindrical body 102 within the beverage holder against loads applied at the mounting platform 104 portion of the upper platform portion 106. Upon removal from the beverage container, the cilia 140 resiliently straighten and are again oriented for insertion into the same or another beverage holder.

FIG. 12 also illustrates by example and without limitation the one or more flexible or pliable members 114 embodied as a quantity of conical knobs 142 projecting radially outwardly from the external surface of the wall portion 128. The conical knobs 142 are formed, by example and without limitation, by injection molding of the resiliently flexible or pliable plastic, a rubber, or another resiliently flexible or pliable material used in forming the cup-shaped lower insertion portion 112. The conical knobs 142 are structured to resiliently flex or resiliently radially compress during entry into the internal bore of the beverage holder and to subsequently press outwardly from the wall portion 128 to interfere with an internal wall surface of the beverage holder. The flexible or pliable members 114 embodied as a quantity of conical knobs 142 thereby effectively secure the lower insertion portion 112 of the cylindrical body 102 within the beverage holder against loads applied at the mounting platform 104 portion of the upper platform portion 106. Upon removal from the beverage container, the conical knobs 142 resiliently expand or straighten to their pre-insertion size and shape and are again oriented for insertion into the same or another beverage holder.

Figure 13:
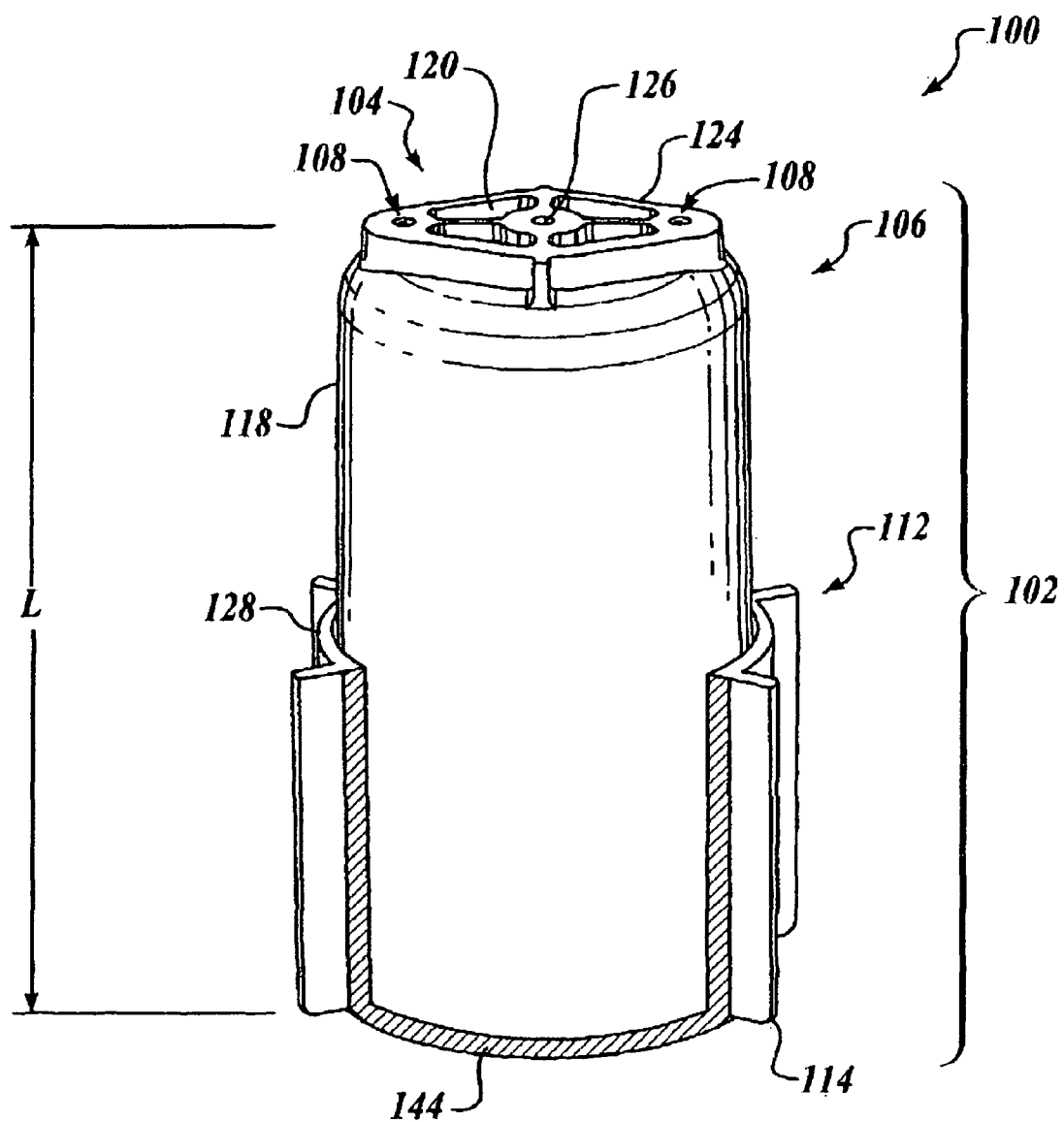
FIG. 13 illustrates the upper platform portion of the universally positionable platform of the invention according to another alternative embodiment of the invention, wherein the upper platform portion is embodied in a generally cylindrical or "can" shape of a common 12 ounce can-type beverage container sized to fit snugly into the cup-shaped lower insertion portion of the invention.

FIG. 13 illustrates the generally cylindrical body 102 of the positionable platform 100 of the invention wherein the upper platform portion 106 is embodied in the generally cylindrical or "can" shape of a common 12 ounce can-type beverage container. The upper platform portion 106 accordingly is sized to fit snugly into the cup-shaped lower insertion portion 112 substantially the same as the common 12 ounce can, as described herein. The generally cylindrical or can-shaped upper platform portion 106 is thus sized approximately the same as a conventional 12 ounce metal beverage can. That is, as described herein, the upper platform portion 106 is about 2½" more or less in diameter by about 4¾" to 5" more or less in length. The generally cylindrical or can-shaped upper platform portion 106 is formed of a relatively rigid material, such as but not limited to a hard plastic, epoxy resin or metal. When formed of a hard plastic, the upper platform portion 106 is optionally injection molded with the features of the mounting platform 104 formed integrally therein for ease of manufacturing. The can-shaped upper platform portion 106 is as an example the hollow cup-shaped portion described in FIGS. 4-5 with the substantially cylindrical wall portion 118 being extended to the overall can length L, whereby weight and material are both minimized. Alternatively, the can-shaped upper platform portion 106 is substantially a can shape having a bottom portion 144 formed at the end of the wall portion 118 opposite from the mounting platform 104. The can-shaped platform portion 106 is optionally formed with an internal hollow so that weight and material are both minimized.

Figures 14A, 14B:
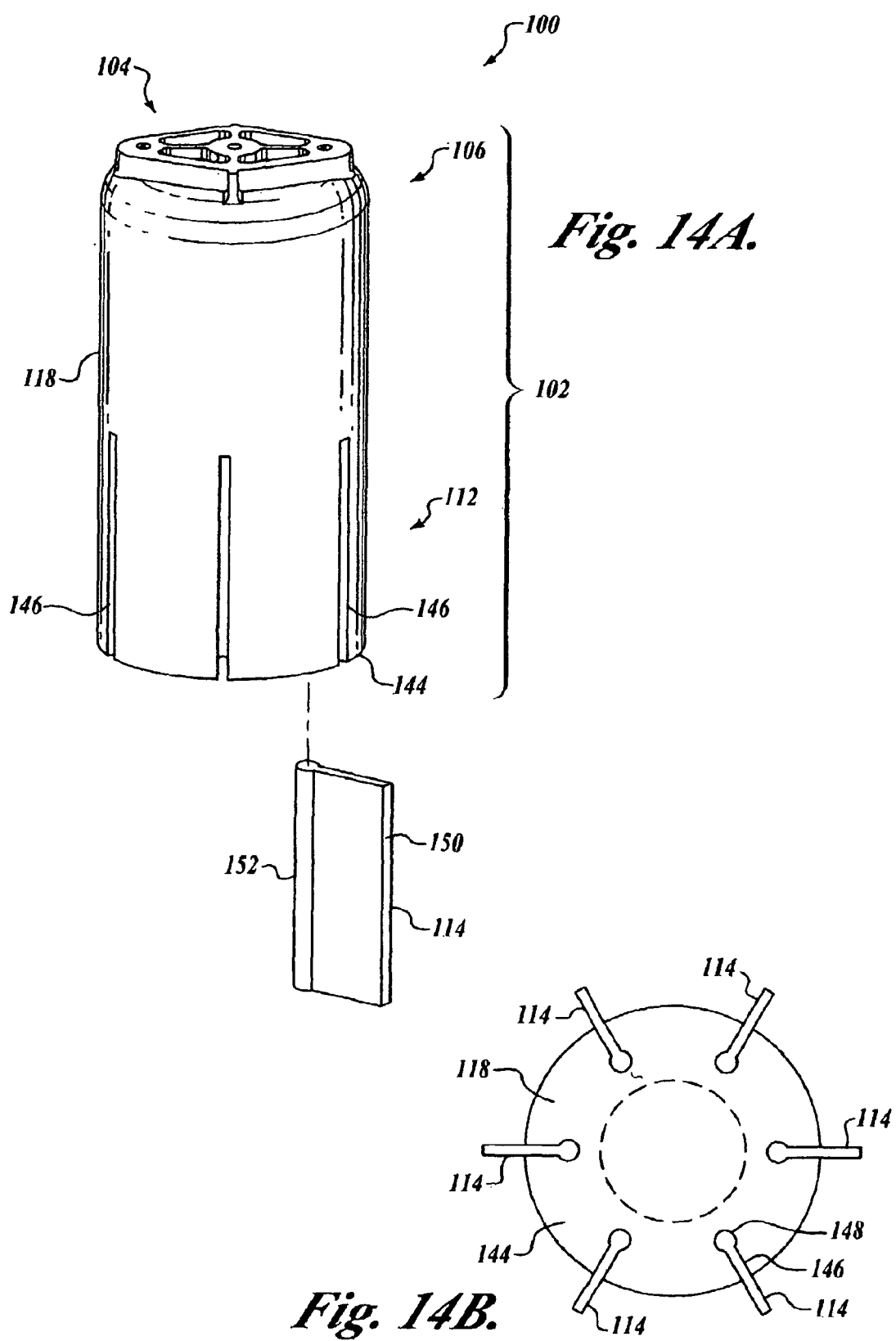

FIGS. 14A and 14B together illustrate another embodiment of the positionable platform 100 of the invention wherein FIG. 14A is a perspective assembly view and FIG. 14B is a bottom view. As illustrated, the upper platform portion 106 is either a substantially solid cylinder "can" shape of a common 12 ounce can-type beverage container or, optionally, includes a thick cylindrical wall portion 118 extended to the overall can length. In either case, the upper platform portion 106 is thus sized approximately the same as a conventional 12 ounce metal beverage can and includes at an upper end the features of the mounting platform 104, as described herein.

The generally cylindrical or can-shaped upper platform portion 106 of FIGS. 14A, 14B is formed of a relatively rigid material, such as but not limited to a hard plastic, epoxy resin or metal. When formed of a hard plastic, the upper platform portion 106 is optionally injection molded with the features of the mounting platform 104 formed integrally therein for ease of manufacturing. The can-shaped upper platform portion 106 is formed with a quantity of attachment apparatus 146 embodied as female apertures each having a female retaining feature 148 formed therein. By example and without limitation, the female apertures 146 are embodied as "keyhole" shaped slots (shown) wherein the female retaining feature 148 is an expanded or bore-shaped area situated at the slot base, although other retaining features are known and are considered to be equivalents of female keyhole retaining feature 148.

The flexible or pliable members 114 are embodied in FIGS. 14A, 14B as key-shaped inserts formed of a pliable plastic or rubber material. The flexible or pliable members 114 embodied as pre-formed key-shaped inserts are formed having a pliable fin portion 150 structured to fit within the female slots 146, and extending from one edge and contiguous therewith a male retaining feature 152. The male retaining feature 152 being an enlarged spine contiguous along one edge of the pliable fin portion 150 and structured to mate with and be retained by the female keyhole retaining feature 148. The flexible or pliable members 114 embodied as pre-formed fin-shaped inserts are inserted into the slots 146 with the male retaining feature 152 fitting into the female keyhole retaining feature 148.

Alternatively, the flexible or pliable members 114 are molded in place in the can-shaped upper platform portion 106, with the male retaining feature 152 filling the female keyhole retaining feature 148, and the pliable fin portion 150 filling and extending radially outwardly from the female slots 146.

Figure 15A:
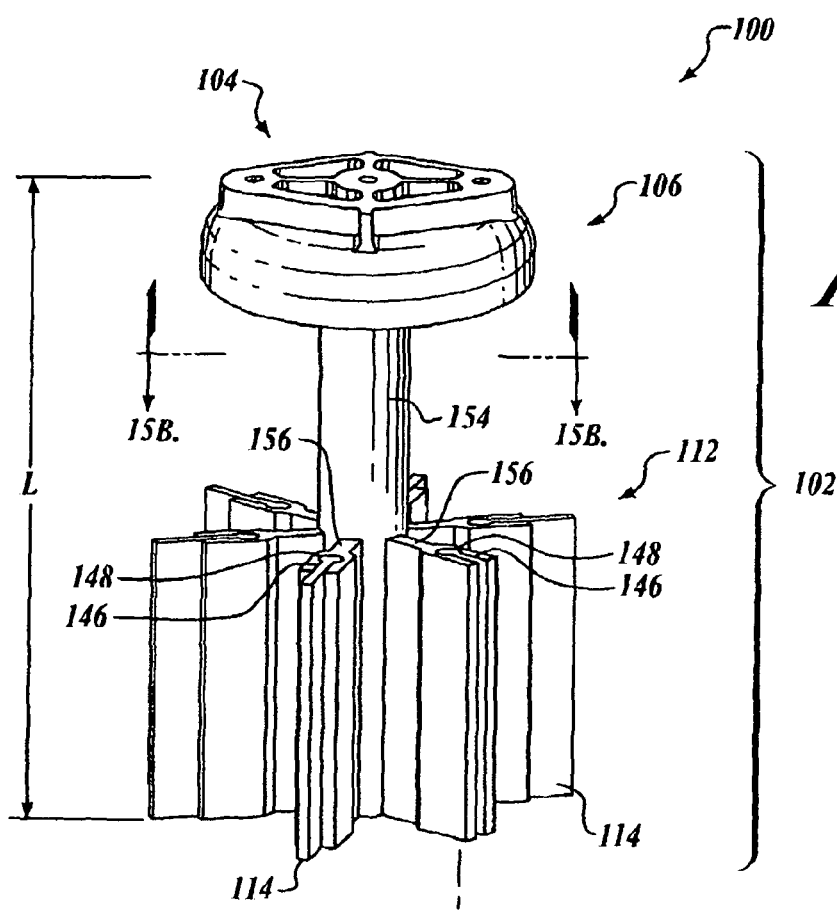
Figure 15B:
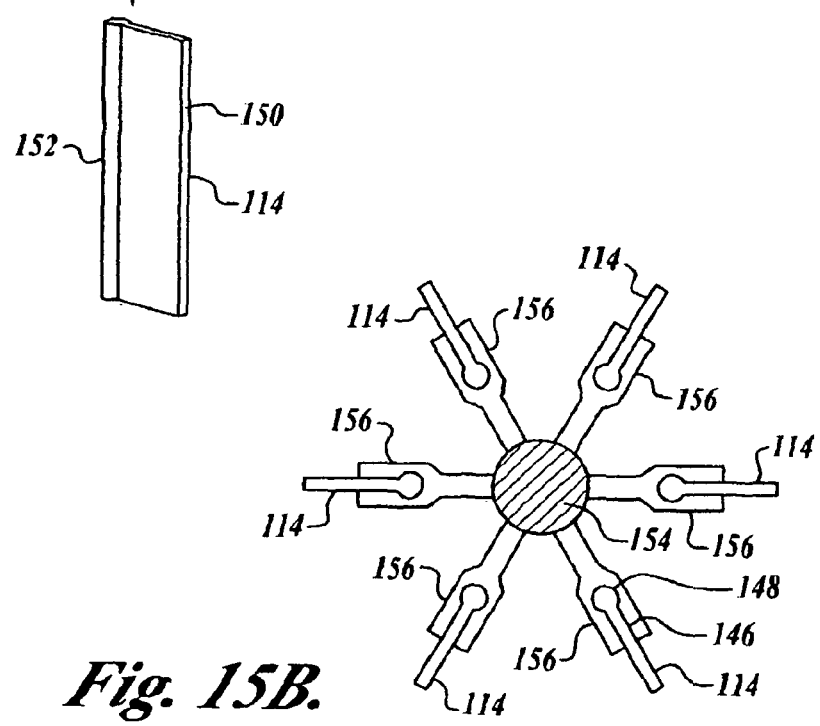

FIGS. 15A and 15B together illustrate another embodiment of the positionable platform 100 of the invention wherein FIG. 15A is a perspective assembly view and FIG. 15B is a cross-section view as shown. As illustrated, the upper platform portion 106 is either a substantially solid foreshortened structure extended to no more than the flexible or pliable members 114, or optionally as an substantially cup-shaped upper platform portion 106 as illustrated in FIGS. 5, 6. In either case, the upper platform portion 106 is thus sized approximately the same diametrical extent as a foreshortened conventional 12 ounce metal beverage can and includes at an upper end the features of the mounting platform 104, as described herein. The foreshortened can-shaped upper platform portion 106 is formed of a relatively rigid material, such as but not limited to a hard plastic, epoxy resin or metal. When formed of a hard plastic, the foreshortened upper platform portion 106 is optionally injection molded with the features of the mounting platform 104 formed integrally therein for ease of manufacturing.

A thick, optionally cylindrical, stem portion 154 extends from the foreshortened upper platform portion 106 to approximately the length L of a conventional 12 ounce beverage can. A quantity of relatively rigid or slightly flexible fins or arms 156 extend radially from the stem portion 154, one of the female apertures 146 described herein being structured along and contiguous with an outer radial surface of each of the fins or arms 156. By example and without limitation, each of the female apertures 146 is embodied as "keyhole" shaped slot (shown) wherein the female retaining feature 148 is an expanded or bore-shaped area situated at the slot base.

The flexible or pliable members 114 are embodied in FIGS. 15A, 15B as key-shaped inserts formed of a pliable plastic or rubber material. The flexible or pliable members 114 embodied as pre-formed key-shaped inserts are formed having a pliable fin portion 150 structured to fit within the female slots 146, and extending from one edge and contiguous therewith a male retaining feature 152 structured to mate with and be retained by the female keyhole retaining feature 148. The flexible or pliable members 114 embodied as pre-formed fin-shaped inserts are inserted into the slots 146 with the male retaining feature 152 fitting into the female keyhole retaining feature 148.

Alternatively, the flexible or pliable members 114 are molded in place in the can-shaped upper platform portion 106, with the male retaining feature 152 filling the female keyhole retaining feature 148, and the pliable fin portion 150 filling and extending radially outwardly from the female slots 146.

Figure 16:
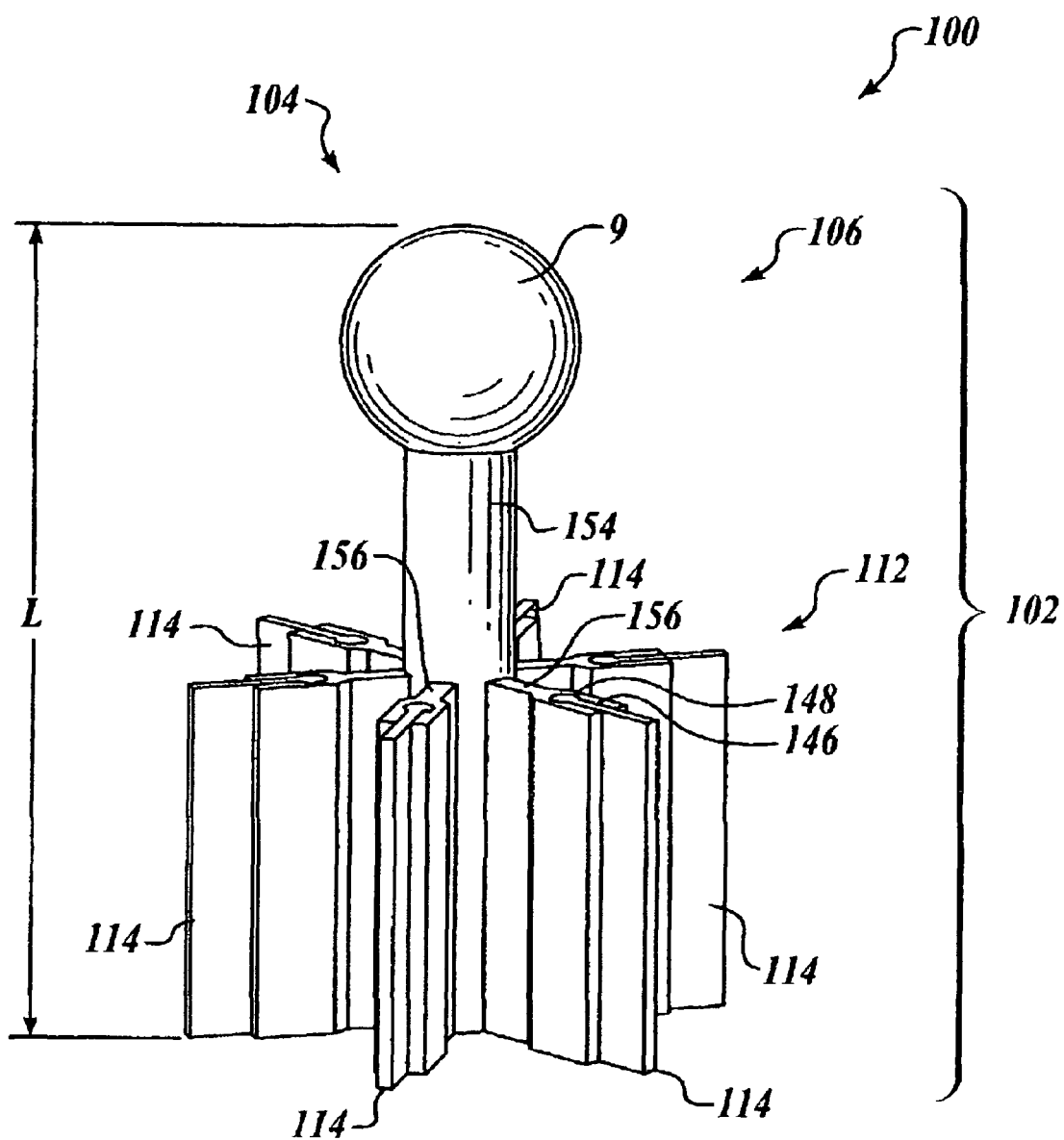
FIG. 16 illustrates still another embodiment of the positionable platform of the invention wherein the upper platform portion is embodied according to the universal mounting device described in U.S. Pat. No. 5,845,885.

FIG. 16 illustrates still another embodiment of the positionable platform 100 of the invention wherein the upper platform portion 106 is embodied according to the universal mounting device 1 as described in U.S. Pat. No. 5,845,885 and shown in FIG. 1 herein. Accordingly, a sphere 9 of resiliently compressible material is presented on the stem portion 154 for access by a pair of clamping arms 13 (shown in FIG. 1) that together form a socket that is positionally secured relative to the sphere 9, as described herein and in U.S. Pat. No. 5,845,885. The sphere 9 and stem portion 154 combine to approximately the length L of a conventional 12 ounce beverage can.

A quantity of the relatively rigid or slightly flexible fins or arms 156 extend radially from the stem portion 154, each of the radial arms 156 being structured with one of the female apertures 146 along and contiguous with its outer radial surface, as described herein. By example and without limitation, each of the female apertures 146 is embodied as "keyhole" shaped slot (shown) wherein the female retaining feature 148 is an expanded or bore-shaped area situated at the slot base. The flexible or pliable members 114 are embodied as either the pre-formed key-shaped inserts formed of a pliable plastic or rubber material or are molded in place, as described herein.

FIGS. 17A and 17B together illustrate another embodiment of the positionable platform 100 of the invention wherein FIG. 17A is a perspective assembly view and FIG. 17B is a cross-section view as shown. As illustrated, the upper platform portion 106 is embodied according to the universal mounting device 1 as described in U.S. Pat. No. 5,845,885 and shown in FIG. 1 herein, having the sphere 9 of resiliently compressible material presented on the stem portion 154. The sphere 9 and stem portion 154 combining to approximately the length L of a conventional 12 ounce beverage can.

A quantity of the relatively rigid or slightly flexible fins or arms 158 extend radially from the stem portion 154, each of the radial arms 158 being structured with one of the attachment apparatus 146 embodied as a part-cylindrical male retaining feature. The male retaining features 146 being embodied, by example and without limitation, as partial cylinders elongate to extend along and contiguous with an outer radial surface of each of the radial arms 158.

The flexible or pliable members 114 are embodied in FIGS. 17A, 17B as wishbone-shaped inserts formed of a pliable plastic or rubber material. The flexible or pliable members 114 embodied as pre-formed wishbone-shaped inserts are formed having a pliable fin portion 160 Extending from one edge of each pliable fin portion 160 and contiguous therewith a keyhole-shaped female retaining feature 162 is structured to fit over with and be retained by the attachment apparatus 146 embodied as the part-cylindrical male retaining feature. The flexible or pliable members 114 embodied as pre-formed fin-shaped inserts are inserted over the radial arms 158 with the keyhole-shaped female retaining feature 162 fitting over the part-cylindrical male retaining feature 146 at the radial extreme of the radial arms 158.

Alternatively, the flexible or pliable members 114 are molded in place over the radial arms 158, with the male retaining feature 146 filling the female keyhole retaining feature 162, and the pliable fin portion 160 filling and extending radially outwardly from the radial arms 158.

Although illustrated using the sphere 9 of resiliently compressible material presented on the stem portion 154, the embodiment of FIGS. 17A, 17B is equally practicable using the substantially cup-shaped upper platform portion 106 illustrated in FIGS. 5, 6.

As discussed herein and illustrated in FIG. 4, some known beverage holders are sized or otherwise tailored to accept a standard 12 ounce can or bottle snugly and hold it securely. According to one or more embodiments of the invention, the universally positionable platform includes a bottom or lower end sized to fit within such a tailored beverage holder, and a top end structured with one of the mechanical mounting platforms discussed herein and illustrated in the Figures for accepting a mechanical connector thereto.

Figure 18:
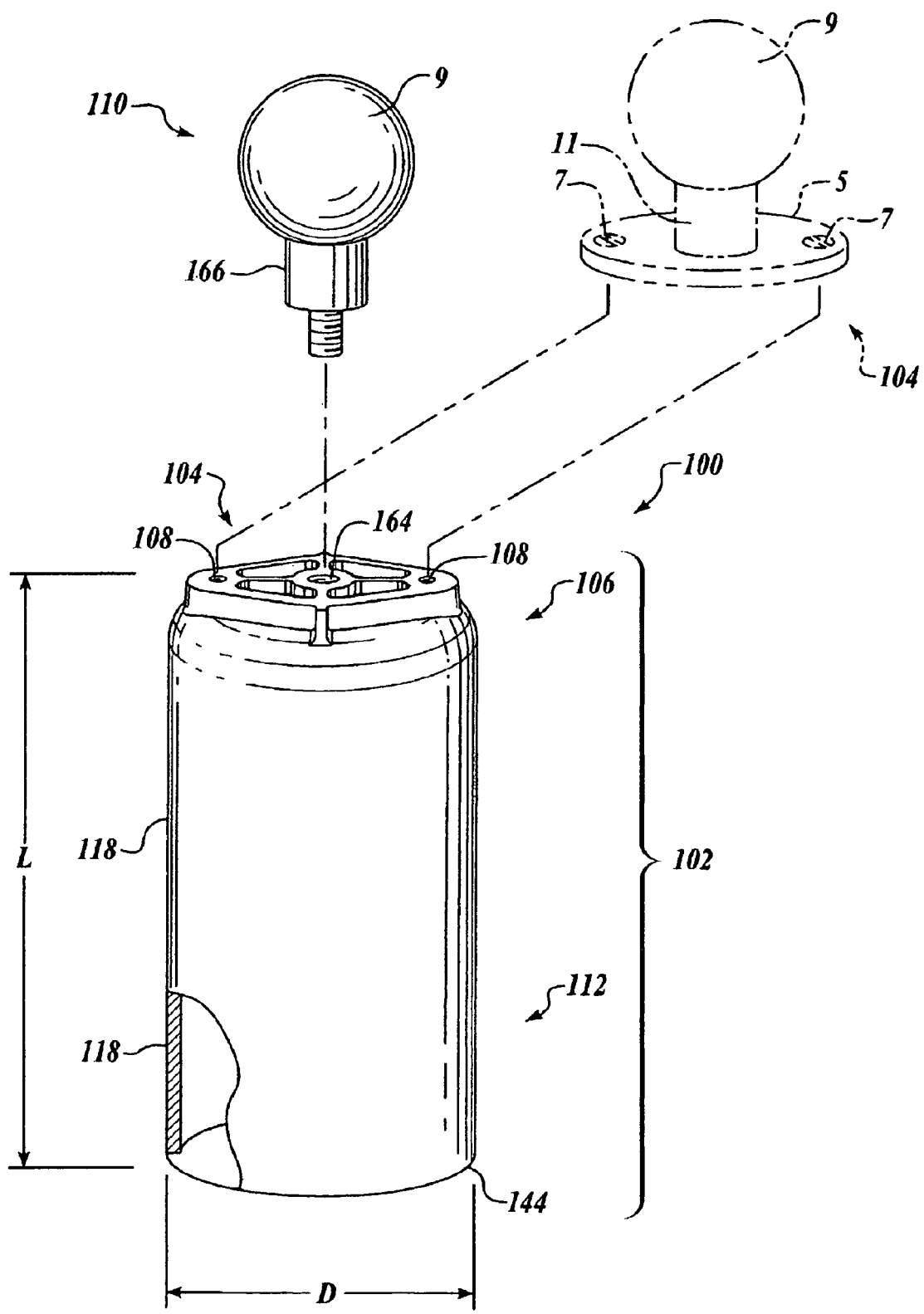
FIG. 18 illustrates three different embodiments of the positionable platform of the invention for use with a beverage holder structured to accept and securely tend a standard 12 ounce can or bottle.

FIG. 18 illustrates three different embodiments of the positionable platform of the invention for use with a beverage holder structured to accept and securely tend a standard 12 ounce can or bottle. Accordingly, the universally positionable platform 100 includes the generally cylindrical body 102 sized approximately the same as or slightly larger than a conventional twelve 12 ounce hollow glass or plastic bottle or metal beverage can. That is to say, having a diameter D of about two and one-half inches (2½") or more and a length L of about four and three-quarters to five inches (4" to 5") more or less. The universally positionable platform 100 thus includes the substantially cylindrical base or insertion portion 112 that is structured for being securely inserted into any one of the beverage holders that is structured to accept and securely tend a standard twelve (12) ounce beverage container.

Figure 1:
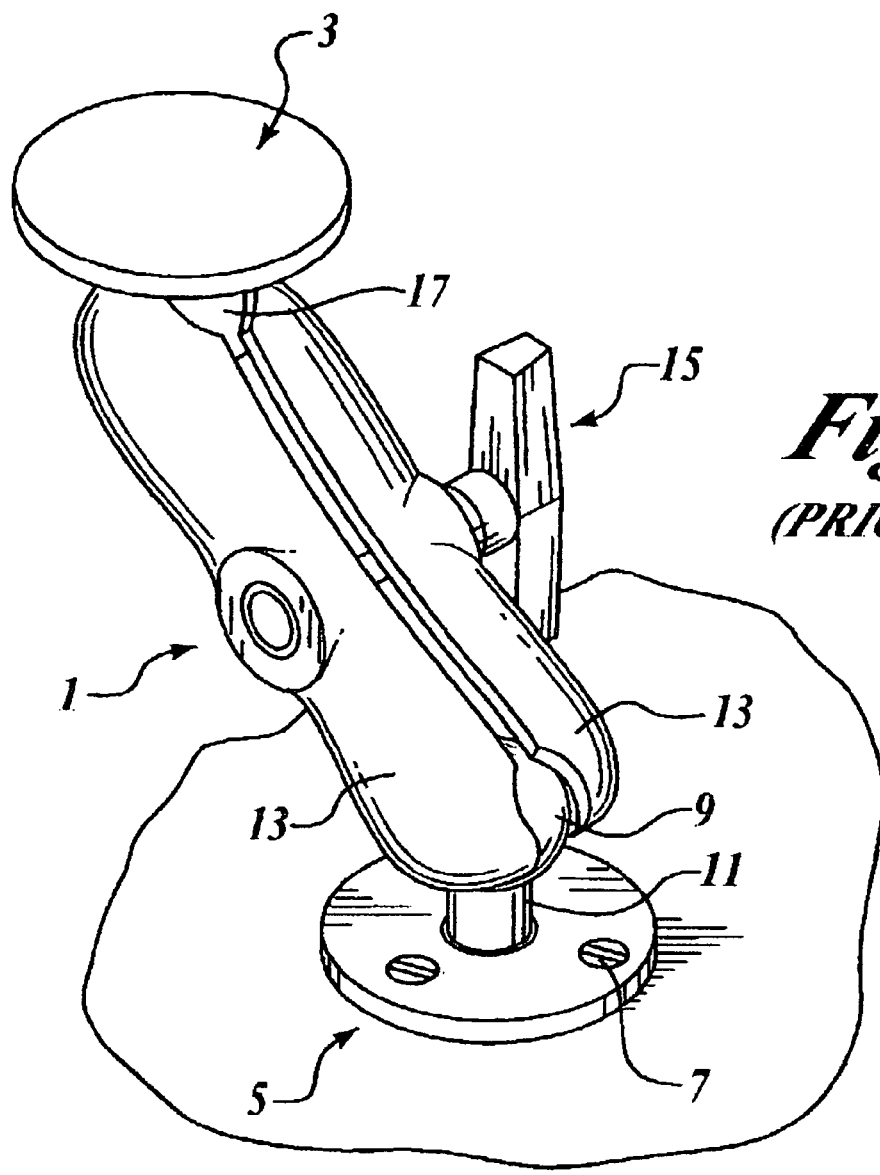
FIG. 1 illustrates one known universal mounting device described in U.S. Pat. No. 5,845,885.

The universally positionable platform 100 also includes the mounting portion 104 coupled to the base portion and being structured with one of the different mechanical mounting means described herein or another suitable mounting means. For example, the mounting platform 104 is structured as described herein as a substantially rigid pedestal having a pair of spaced apart holes 108 for mounting one or another known device platform 110 (shown in FIG. 4). Optionally, the mounting platform 104 is structured to accept the base 5 portion of the universal mounting device 1 illustrated in FIG. 1 and disclosed in U.S. Pat. No. 5,845,885, which is incorporated by reference herein. The base 5 is secured with a quantity of screws or other fasteners 7. The universally positionable platform 100 thereby presents the sphere 9 of resiliently compressible material on a post 11 for access by a clampable socket, as illustrated in FIG. 1.

Alternatively, the base 5 portion of the universal mounting device 1 is formed integrally with the upper platform portion 106 of the apparatus as the mounting platform 104. According to another optional embodiment of the universally positionable platform 100 of the invention, the mounting platform 104 is structured with a substantially centrally located threaded bore 164 for mounting of a threaded device platform 110. For example, the device platform 110 is structured as the sphere 9 of resiliently compressible material discussed herein mounted on a threaded post 166 structured to thread into the threaded bore 164. Other configurations of the mounting platforms 104 are also contemplated by the invention and are considered to be equivalents of the several configurations described herein.

The base and mounting portions are both formed of a substantially rigid material. For example, the base and mounting portions are formed of such materials as hard plastic, epoxy resin, or metal. Optionally, the insertion base 112 and upper platform portion 106 having the mounting platform 104 are coupled to form the generally cylindrical body 102 as a single integral unit, as illustrated. The coupled base and mounting portions in combination are sized similarly to a standard 12 ounce beverage container. According to different embodiments of the invention, the integral cylindrical body 102 includes the substantially cylindrical base or insertion portion 112 and the upper platform portion 106, which are integrally formed either as a solid body or as a hollow body having a substantially tubular wall 118. The tubular wall 118 is either open at its base or is closed by the bottom portion 144, as described herein.

Figures 19A, 19B:
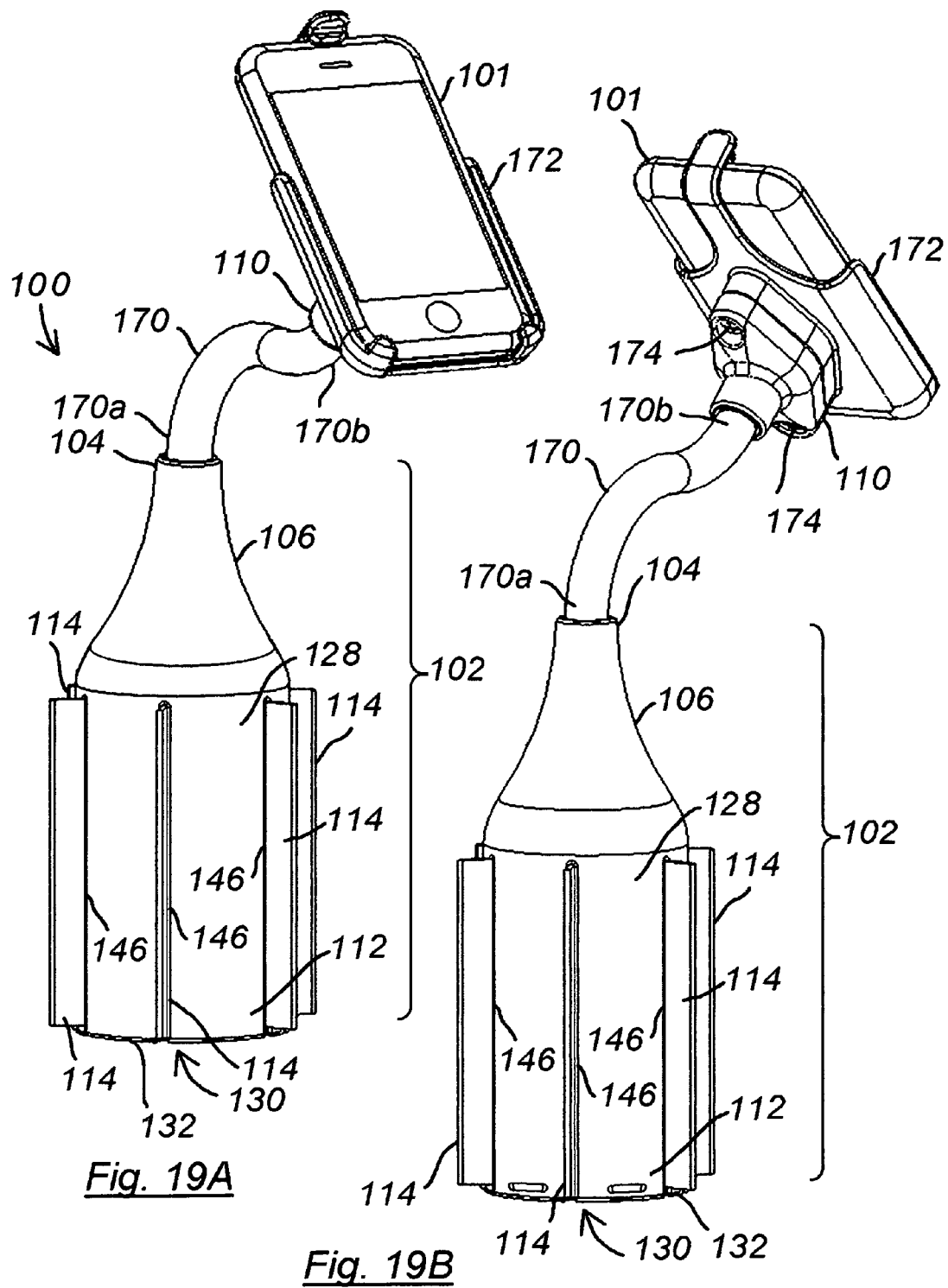
FIGS. 19A and 19B are perspective assembly views that illustrates another embodiment of the positionable platform similar to the embodiment illustrated in FIGS. 14A and 14B, wherein the generally cylindrical body sized approximately the same as or slightly shorter than a conventional twelve (12) ounce hollow glass or plastic beverage bottle (shown) or metal beverage can.

FIGS. 19A and 19B are perspective assembly views that illustrates another embodiment of the positionable platform 100 similar to the embodiment illustrated in FIGS. 14A and 14B, wherein the generally cylindrical body 102 sized approximately the same as or slightly shorter than a conventional twelve (12) ounce hollow glass or plastic beverage bottle (shown) or metal beverage can. In either the beverage can or bottle shape, the generally cylindrical body 102 is a single monolithic structure that includes both the first or upper platform portion 106 and the second or lower insertion portion 112 that is structured for being securely inserted into any one of the many different types of generally well-known portable and fixed-position beverage holders, such as but not limited to those portable and fixed-position beverage holders discussed herein and commonly found in or for use with many different vehicles. The generally cylindrical body 102 is thus sized approximately the same diameter as a conventional 12 ounce metal beverage can or bottle, but is optionally shorter so that the upper platform portion 106 does not extend unduly from the beverage holder.

Here, the upper platform portion 106 of the body 102 is formed having an optionally curvilinear conical shape and includes at an upper end the features of the mounting platform 104, as described herein. By example and without limitation, the mounting platform 104 is structured to retain a support apparatus 170 structured as a monolithic flexible rod or "arm" that is formed of a permanently bendable metal rod, e.g., aluminum. The permanently bendable metal rod support apparatus 170 is both strong enough to support a cradle 172 coupled to the device platform 110 and holding the small electronics device 101, as well as flexible enough to easily arrange the device platform 110 for presenting the cradle 172 and device 101 in a desired position and orientation. By example and without limitation, the flexible support arm 170 is sized in the approximate range of about ⅛ inch to ¼ inch diameter, which provides both the desired strength and flexibility. As illustrated here by example and without limitation, a near end 170a of the flexible support arm 170 is fused to the mounting platform 104, as by electrosonic welding when the upper platform portion 106 is formed of a hard plastic, epoxy resin, or composite material, and the device platform 110 is fused to an opposite far end 170b of the flexible support arm 170. When the upper platform portion 106 is formed of a metallic material, e.g., aluminum, the flexible support arm 170 is fused by a conventional welding or other conventional metal-fusing process. The cradle 172 is appropriately mounted on the device platform 110, e.g., using one or more fasteners 174.

The monolithic body 102 is either substantially solid throughout, else is hollow in the middle with the generally cylindrical shape being formed by the thick cylindrical wall portion 128 extended approximately the overall bottle length and ending in the substantially solid base portion 130, for example as illustrated in FIG. 6. Optionally, the cylindrical wall and base portions 128, 130 intersect at the curving joint 132 formed, by example and without limitation, with external round and corresponding internal fillet shapes.

A quantity of the resiliently flexible or pliable members 114 are provided on the relatively rigid monolithic body 102 running substantially the entire length of the wall portion 128. By example and without limitation, the wall portion 128 is formed with a quantity of the female retention apertures 146 shown as "keyhole" shaped retention slots running longitudinally of the body 102 and structured to receive and retain the pliable members 114. By example and without limitation, the wall portion 128 contains six of the longitudinally arranged keyhole apertures 146 each structured to hold one of the pliable members 114 substantially evenly spaced at about sixty degree intervals about the circumference of the body 102.

FIG. 20 is a perspective view of the monolithic body 102 with the flexible support arm 170 and pliable members 114 removed for clarity. Here, the mounting platform 104 of the upper platform portion 106 is shown to include a cylindrical recess 176 for securely receiving thereinto the flexible support arm 170 or another support apparatus. As also illustrated here, the keyhole apertures 146 extend for substantially the entire length of the wall portion 128 of the monolithic body 102. The cylindrical recess 176 for the flexible support arm 170 optionally includes a wider mouth portion 176a sized to receive one end of an optional ornamental sleeve fitted over exposed portion of the support arm 170 between the monolithic body 102 and the device platform 110.

Mouth openings 178 into the respective keyhole apertures 146 are formed in a hem portion 180 of the wall 128 adjacent to the base portion 130 of the monolithic body 102. The mouth openings 178 are keyhole shaped and sized to receive the male retaining feature 152 of the respective pliable members 114 into the respective keyhole apertures 146, with the pliable fin portion 150 filling and extending radially outwardly from the female slots 146. The keyhole apertures 146 are closed at upper ends 146a by the upper platform portion 106 of the body 102, The upper platform portion 106 of the body 102 thus restrains the different pliable members 114 from sliding out of the keyhole apertures 146 when the platform 100 is inserted into a tightly fitting cup holder.

FIG. 21 is a longitudinal cross-section view of the monolithic body 102 showing the mounting platform 104 of the upper platform portion 106 having the cylindrical recess 176 for receiving thereinto the flexible support arm 170 or another support apparatus. As illustrated here, the monolithic body 102 is hollow, having substantially cylindrical longitudinal cavity 182 within the wall portion 128 and extending from the hollow conical upper platform portion 106 to a mouth opening 184 into the base portion 130. Optionally, a lid or cover plate 186 is coupled into the mouth opening 184. The cover plate 186 cooperates with the monolithic body 102 both for closing hollow cavity 182 and for retaining the pliable members 114 within the respective keyhole apertures 146, for example by blocking the respective mouth openings 178 thereinto, which restricts egress therefrom of the pliable members 114. The wall portion 128 of the monolithic body 102 is further structured to retain the cover plate 186 relative to the mouth opening 184 of the cavity 182 as well as the individual mouth openings 178 into the respective keyhole apertures 146. For example, as illustrated here by example and without limitation, the hem portion 180 of the wall 128 is optionally formed with a quantity of two or more apertures 188 for receiving cooperating retainer tabs 190 formed on a periphery 192 of the cover plate 186. Although the monolithic body 102 is formed of a substantially rigid material, the body wall 128 is sufficiently thin as to retain a small degree of flexibility in the hem portion 180. Accordingly, the mouth opening 184 is able to deform outwardly sufficiently to receive the tabbed cover plate 186, yet the body wall 128 is sufficiently rigid to recover its original substantially cylindrical shape when the retainer tabs 190 encounter and are received into the respective wall apertures 188. The retainer tabs 190 thus snap into the respective wall apertures 188, and the cover plate 186 is substantially permanently retained in the mouth opening 184 when the hem portion 180 of the wall 128 regains its original substantially cylindrical shape.

FIG. 22 is perspective view of the generally cylindrical body 102 of the positionable platform 100 with the cover plate 186 removed for clarity. The female retaining feature 148 of respective keyhole apertures 146 are formed longitudinally on an interior portion 194 of the wall 128. The mouth openings 178 into the female retaining feature 148 of respective keyhole apertures 146 are formed in the hem portion 180 of the wall 128 adjacent to the base portion 130 of the monolithic body 102. The male retaining feature 152 of the respective pliable members 114 are received into the keyhole-shaped mouth openings 178 of the respective keyhole apertures 146, with the pliable fin portion 150 filling and extending radially outwardly of the cylindrical body wall 128 from the female slots 146. The positionable platform 100 is illustrated by example and without limitation as having six of the keyhole apertures 146 evenly distributed about the circumference of the generally cylindrical body 102 at about sixty degree intervals. More or fewer of the keyhole apertures 146 and associated pliable members 114 may be provided without departing from the spirit and scope of the invention. Additionally, the keyhole apertures 146 and associated pliable members 114 may be distributed differently about the body 102 without departing from the spirit and scope of the invention.

Here, the mouth opening 184 into the base portion 130 is illustrated as being formed or "stepped" with an optional enlarged recessed lip 196 sized to receive the optional lid or cover plate 186 and terminating in a landing 198. Accordingly, when the optional recessed lip 196 is present, the cover plate 186 is recessed into the mouth opening 184 within the hem portion 180 and seated on or adjacent to the landing 198. When present, the apertures 188 are positioned in the recessed lip portion 196 of the hem 180 for receiving cooperating retainer tabs 190 formed on the cover plate 186.

FIG. 23 is a cross-section through the generally cylindrical body 102 of the positionable platform 100 that more clearly illustrates the male retaining feature 152 of the respective pliable members 114 being seated in the keyhole-shaped mouth openings 178 of the respective keyhole apertures 146, with the pliable fin portion 150 filling and extending radially outwardly of the cylindrical body wall 128 from the female slots 146.

FIG. 24 illustrates another embodiment of the female retaining feature 148 of respective keyhole retention apertures 146 wherein the retaining feature 148 is a wedge shaped keyhole. Here, the male retaining feature 152 of the respective pliable members 114 are cooperating wedge shaped spine portions received into the wedge-shaped mouth openings 178 of the respective wedge-shaped keyhole apertures 146, with the male retaining feature 152 gradually narrowing to the pliable fin portion 150 which fills the opening of the female slots 146 to the body wall 128 and extends radially outwardly of the cylindrical body wall 128.

Figures 25, 26:
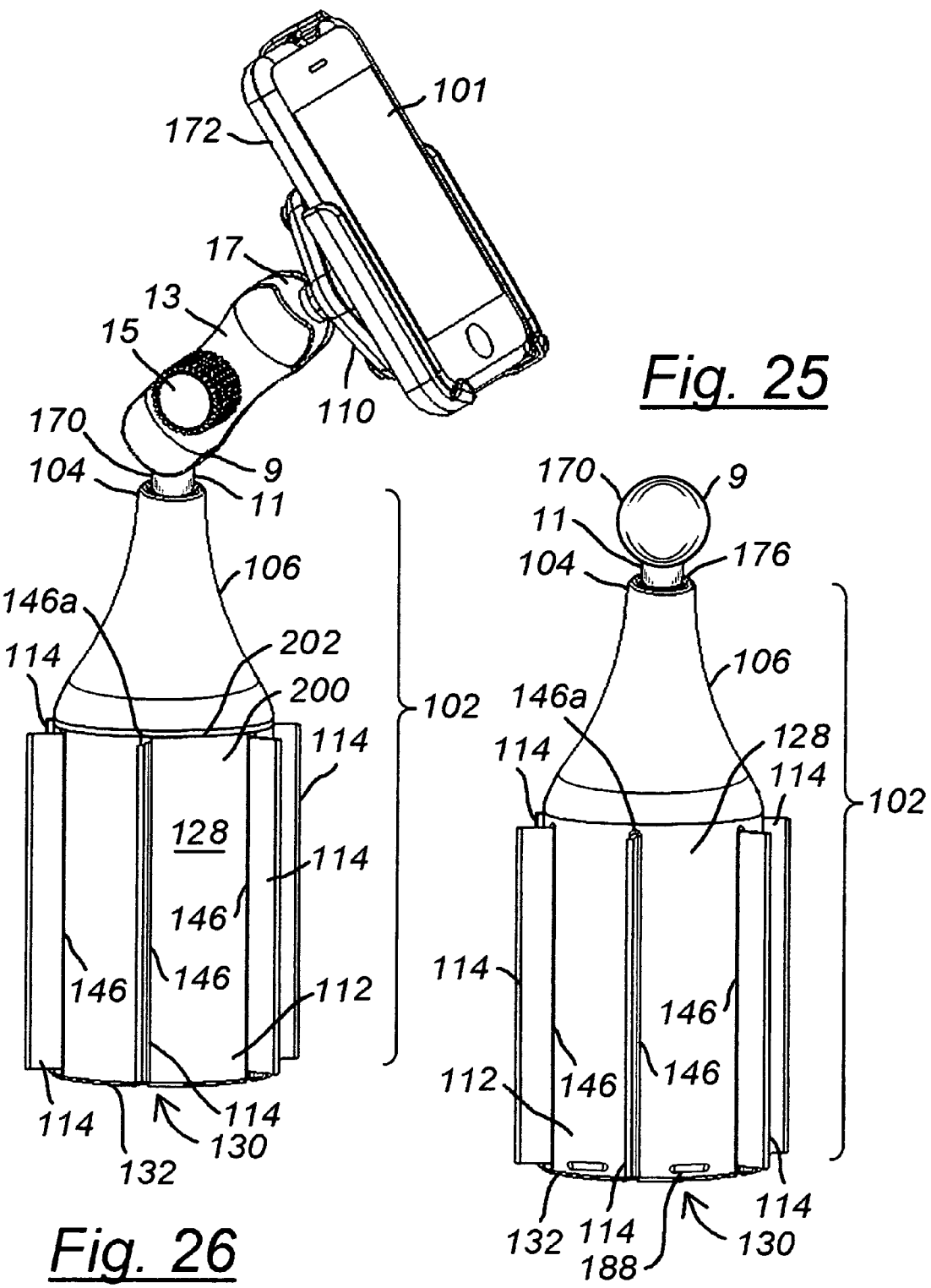
FIGS. 25 and 26 are perspective assembly views that illustrates another embodiment of the positionable platform similar to the embodiment illustrated in FIGS. 19A and 19B.

FIGS. 25 and 26 are perspective assembly views that illustrates another embodiment of the positionable platform 100 similar to the embodiment illustrated in FIGS. 19A and 19B. Here, the optionally curvilinear conical-shaped upper platform portion 106 of the body 102 is formed having at an upper end the features of the mounting platform 104, as described herein. By example and without limitation, the mounting platform 104 is structured to retain a different support apparatus 170 structured to cooperate with the universal mounting device 1 shown here and described in U.S. Pat. No. 5,845,885, which is incorporated by reference herein in its entirety. By example and without limitation, the support apparatus 170 is structured as the sphere 9 of resiliently compressible material is presented on the post 11. The post 11 is securely received into the cylindrical recess 176 of the mounting platform 104.

FIG. 26 illustrates the pair of clamping arms 13 together forming a socket that is positionally secured relative to the sphere 9 when the clamping mechanism 15 is tightened. The positionable device platform 110 is presented on the second sphere 17 of resiliently compressible material that is captured in a second socket formed at the opposite end of the and relatively positionally secured by increased tightening of the clamping mechanism 15. The clamping arms 13 forms a pair of ball-and-socket connections which are both strong enough to support the cradle 172 coupled to the device platform 110 and hold the small electronics device 101, as well as flexible enough to easily arrange the device platform 110 for presenting the cradle 172 and device 101 in a desired position and orientation.

The positionable device platform 110 is optionally structured to support any of the above variety of mobile devices or another device or structure of the user's choice.

Furthermore, the generally cylindrical body 102 is optionally a constant cross-section, such as may be formed by extrusion and cut to a selected length. Accordingly, the conical upper platform portion 106 is coupled to an upper end 200 of the substantially cylindrical wall portion 128 opposite from the hem portion 180. For example, a fusion or adhesive bond joint 202 is formed between the upper platform portion 106 and the upper end 200 of the wall portion 128. The wall portion 128 and upper platform portion 106 are thus conjoined to form the single monolithic structure of the generally cylindrical body 102. Additionally, the conjunction of the upper platform portion 106 with the upper end 200 of the wall portion 128 effectively closes the upper ends 146a of the keyhole apertures 146 for restraining the different pliable members 114 from sliding out of the keyhole apertures 146 when the platform 100 is inserted into a tightly fitting cup holder.

Optionally, the upper end 200 of the wall portion 128 is configured similarly to the hem portion 180, including the optional enlarged recessed lip 196 terminating in the landing 198. The upper platform portion 106 is structured to fit into the recessed lip 196 and, optionally, to seat against the landing 198.

Figures 27, 28:
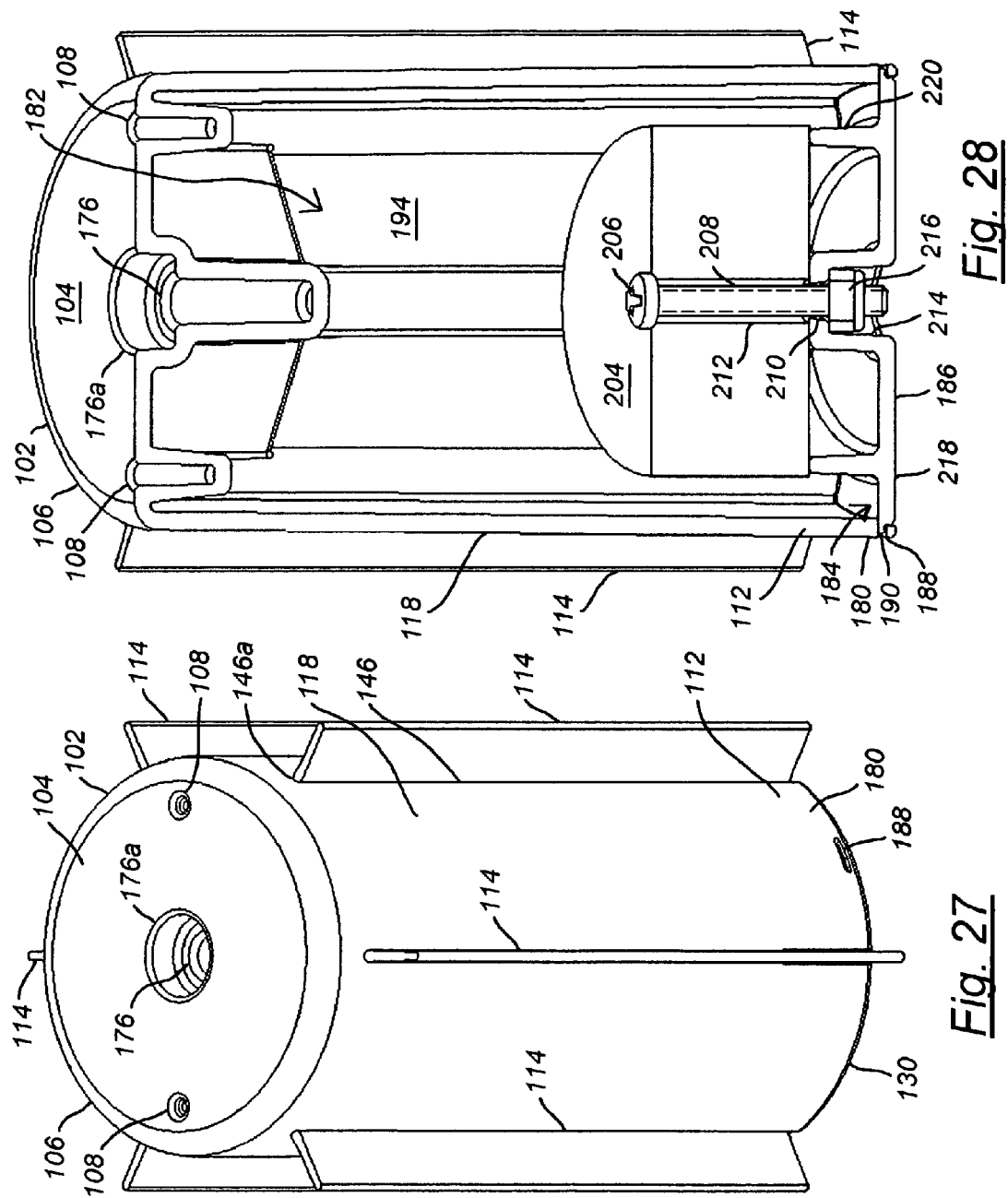
FIG. 27 is a perspective assembly view that illustrates another embodiment of the positionable platform similar to the embodiment illustrated in FIGS. 14A and 14B, wherein the generally cylindrical body sized approximately the same as or slightly shorter than a conventional twelve (12) ounce hollow can-type beverage container.
FIG. 28 is a cross-section taken longitudinally through the positionable platform assembly that illustrates another aspect of the generally cylindrical body.

FIG. 27 is a perspective assembly view that illustrates another embodiment of the positionable platform 100 similar to the embodiment illustrated in FIGS. 14A and 14B, wherein the generally cylindrical body 102 sized approximately the same as or slightly shorter than a conventional twelve (12) ounce hollow can-type beverage container. The generally cylindrical body 102 is a single monolithic structure that includes both the first or upper platform portion 106 and the second or lower insertion portion 112 that is structured for being securely inserted into any one of the many different types of generally well-known portable and fixed-position beverage holders, such as but not limited to those portable and fixed-position beverage holders discussed herein and commonly found in or for use with many different vehicles. The generally cylindrical body 102 is thus sized approximately the same diameter as a conventional 12 ounce metal beverage can or bottle, but is optionally shorter so that the upper platform portion 106 does not extend unduly from the beverage holder.

As illustrated, the body 102 is either a substantially solid cylinder "can" shape of a common 12 ounce can-type beverage container or, optionally, includes the thick cylindrical wall portion 118 extended to the overall can length. In either case, the upper platform portion 106 is thus sized approximately the same as a conventional 12 ounce metal beverage can and includes at an upper end the features of the mounting platform 104, as described herein.

The generally cylindrical or can-shaped body 102 is formed of a relatively rigid material, such as but not limited to a hard plastic, epoxy resin or metal. When formed of a hard plastic, the upper platform portion 106 is optionally injection molded with the features of the mounting platform 104 formed integrally therein for ease of manufacturing. Here, the mounting platform 104 includes the pair of spaced apart holes 108, which are shown here as being internally threaded for securely receiving a screw or other threaded fastener. The mounting platform 104 also includes central thereof the cylindrical recess 176 for securely receiving thereinto the flexible support arm 170 or another support apparatus. The mounting platform 104 is thus configured to adapt to securely receive support apparatus 170 of different configurations.

Accordingly, similar to the configuration illustrated in FIG. 18, here the mounting platform 104 is structured to accept the base 5 portion of the universal mounting device 1 illustrated in FIG. 1 and disclosed in U.S. Pat. No. 5,845,885, which is incorporated by reference herein. The base 5 is secured with the quantity of screws or other fasteners 7. The universally positionable platform 100 thereby presents the sphere 9 of resiliently compressible material on a post 11 for access by a clampable socket, as illustrated in FIG. 1. Additionally, the mounting platform 104 is structured with a substantially centrally located cylindrical recess 176 for securely receiving thereinto the flexible support arm 170, or the threaded bore 164 for mounting of a threaded device platform 110. For example, the device platform 110 is structured as the sphere 9 of resiliently compressible material discussed herein mounted on a threaded post 166 structured to thread into the threaded bore 164. Other configurations of the mounting platforms 104 are also contemplated by the invention and are considered to be equivalents of the several configurations described herein.

The wall 118 is formed with a quantity of the attachment apparatus 146 embodied as female apertures each having a female retaining feature 148 formed therein. By example and without limitation, the female apertures 146 are embodied as "keyhole" shaped slots (shown) wherein the female retaining feature 148 is an expanded or bore-shaped area situated at the slot base, although other retaining features are known and are considered to be equivalents of female keyhole retaining feature 148 and may be substituted without departing from the spirit and scope of the invention.

A quantity of the resiliently flexible or pliable members 114 are provided on the relatively rigid monolithic body 102 running substantially the entire length of the wall portion 118. By example and without limitation, the wall portion 118 is formed with a quantity of the female apertures 146 shown as "keyhole" shaped slots running longitudinally of the body 102 and structured to receive and retain the pliable members 114. By example and without limitation, the wall portion 128 contains six of the longitudinally arranged keyhole apertures 146 each structured to hold one of the pliable members 114 substantially evenly spaced at about sixty degree intervals about the circumference of the body 102.

FIG. 28 is a cross-section taken longitudinally through the positionable platform assembly 100 that illustrates another aspect of the generally cylindrical body 102. Here, the pair of spaced apart holes 108 of the mounting platform 104 are shown, by example and without limitation, being configured as smooth bores that are amenable to receiving conventional self-tapping screw fasteners.

Furthermore, the substantially cylindrical longitudinal cavity 182 within the wall portion 118 is at least partially filled with a weight 204. By example and without limitation, the weight 204 is positioned adjacent to the base portion 130 for lowering the center of gravity of the assembly 100. Optionally, the weight is integrated with the lid or cover plate 186 and attached within the body cavity 182 when the cover plate 186 is attached into the cavity mouth opening 184. According to one embodiment, the cover plate 186 is formed including weight 204 in a single monolithic structure. Else, the weight 204 is coupled to the cover plate 186. By example and without limitation, the weight 204 is coupled to the cover plate 186 using a fusion or adhesive bond, or one or more mechanical fasteners 206 (shown) such as a rivet or threaded fastener. Here, the mechanical fasteners 206 is illustrated by example and without limitation as a threaded fastener having a shank portion 208 coupled through an aperture 210 in the cover plate 186 and extended through a passage 212 in the weight 204. The cover plate 186 is modified to provide a recess 214 sized to receive a nut 216 threaded onto the shank portion 208 of the threaded fastener 206 and space it away from a base surface 218 of the cover plate 186 so as to avoid interference with standing the positionable platform assembly 100 on a flat surface. Other conventional methods are also known for coupling the weight 204 to the cover plate 186, such other methods are also contemplated and may be substituted without deviating from the scope and intent of the present invention.

The cover plate 186 may also be further modified to provide a stabilizer 220 for the weight 204 when it is not convenient to seat it directly on the cover plate 186. By example and without limitation, the stabilizer 220 is configured as a tubular extension of the cover plate 186 upon which the weight 204 is seated when the threaded fasteners 206 is secured.

While the preferred embodiment of the invention has been illustrated and described, it will be appreciated that various changes can be made therein without departing from the spirit and scope of the invention.

What is claimed is:

1. A positionable platform for use with a conventional beverage holder, the positionable platform comprising:
   a body sized to fit within the conventional beverage holder, the body comprising an upper platform portion positioned adjacent to a first end of an outer wall portion thereof, and the outer wall portion comprising a female retention aperture substantially longitudinally aligned therewith;
   a resiliently pliable member retained by the female retention aperture and extended a distance from the outer wall portion of the body to interfere with an internal wall surface of the beverage holder; and
   a mounting platform formed adjacent to the upper platform portion and being structured with a mechanical mounting platform.

2. The positionable platform of claim 1 wherein the body further comprises a substantially rigid material.

3. The positionable platform of claim 2, further comprising a support apparatus coupled to the mechanical mounting platform.

4. The positionable platform of claim 2 wherein the female retention aperture further comprises a female retaining feature formed inside the outer wall portion of the body and communicating with an outer surface of the outer wall portion; and
wherein the resiliently pliable member further comprises a male retaining feature received into the female retaining feature.

5. The positionable platform of claim 4 wherein the female retaining feature further comprises a substantially tubular cavity, and the female retention aperture further comprises a slot formed in the outer wall portion of the body and communicating with the female retaining feature; and
the resiliently pliable member further comprises a fin sized to be received into the slot of the female retention aperture, and the male retaining feature thereof further comprises a spine coupled to the fin and sized to be received into the substantially tubular cavity of the female retaining feature.

6. The positionable platform of claim 4 wherein one of more of the female retention aperture and the female retaining feature communicating therewith further comprises a stop formed adjacent to the upper platform portion of the body.

7. The positionable platform of claim 6 wherein the female retention aperture further comprises an opening thereinto adjacent to a second end of the outer wall portion of the body; and
further comprising a retainer coupled to the body sealing the opening into the female retention aperture.

8. The positionable platform of claim 1 wherein the body further comprises an interior cavity formed therein and substantially encompassed by the outer wall portion.

9. The positionable platform of claim 8 wherein the body further comprises an opening adjacent to a second end of the outer wall portion and communicating with the interior cavity thereof, and
wherein the retainer further comprises a cover plate coupled to the second end of the outer wall portion and coving the opening communicating with the interior cavity.

10. The positionable platform of claim 9 wherein the body further comprising a weighted body.

11. A positionable platform for use with a conventional beverage holder, the positionable platform comprising:
a substantially rigid body sized to fit within a conventional beverage holder, the body comprising an upper platform portion positioned adjacent to a first end of an outer wall portion thereof, and the outer wall portion comprising a plurality of female apertures substantially uniformly distributed there about and substantially longitudinally aligned therewith between the first end thereof and an opposite second end thereof;
a resiliently pliable member resident in each of the plurality of female apertures, each of the resiliently pliable members comprising a fin portion thereof extended from the outer wall portion outwardly of the body and extending along the outer wall portion between the first and second ends thereof; and
a recessed mounting platform formed adjacent to the upper platform portion.

12. The positionable platform of claim 11, further comprising a plurality of female retaining features formed inside the outer wall portion of the body and each communicating with one of the female apertures; and
wherein each of the resiliently pliable members further comprises a male retaining feature coupled to the fin portion thereof and retained within the female retaining feature.

13. The positionable platform of claim 12 wherein each of the female apertures and female retaining features further comprises an opening thereinto communicating with one of the first and second ends of the outer wall portion.

14. The positionable platform of claim 13 wherein at least one of each of the female apertures and female retaining features further comprises a closure positioned adjacent to an end thereof opposite from the opening thereinto.

15. The positionable platform of claim 14, further comprising a retainer coupled to the body adjacent to the opening.

16. The positionable platform of claim 15 wherein the outer wall portion of the body further comprises a substantially cylindrical wall portion, and the fin portions of the resiliently pliable members are further oriented substantially radially thereof.

17. The positionable platform of claim 16 wherein body further comprises an interior cavity formed by the outer wall portion and having an opening thereinto adjacent to the opening into the at least one of each of the female apertures and female retaining features; and
further comprising a cover secured in the opening into the internal cavity.

18. The positionable platform of claim 17, further comprising a weight positioned within the interior cavity.

19. A positionable platform for use with a conventional beverage holder, the positionable platform comprising:
a substantially rigid monolithic body sized similarly to a standard twelve (12) ounce beverage container, the body comprising an upper platform portion positioned adjacent to a first end of a wall portion thereof, and the wall portion comprising a plurality of slotted retention apertures substantially uniformly distributed there about and substantially longitudinally aligned therewith between an opening thereinto adjacent to the first end thereof and a closure positioned adjacent to an opposite second end thereof and having a slot portion communicating between an outer surface of the wall portion and a recessed keyhole portion;
a resiliently pliable member resident in each of the plurality of slotted retention apertures, each of the resiliently pliable members comprising a fin portion thereof positioned partially within the slot portion and extended from the outer surface of the wall portion outwardly of the body and extending along the wall portion between the first and second ends thereof, and a spine portion substantially contiguous with the fin portion and positioned substantially within the recessed keyhole portion; and
a mounting platform positioned adjacent to one of the first and second ends of the body.

20. The positionable platform of claim 19 wherein the monolithic body further comprises an interior cavity partially bounded by the wall portion and having an opening thereinto adjacent to a different one of the first and second ends of the body opposite from the mounting platform.

21. The positionable platform of claim 20, further comprising a cover attached to the opening into the interior cavity of the body, the cover further covering at least a portion of the opening into each of the slotted retention apertures.

22. The positionable platform of claim 21, further comprising a weight secured within the interior cavity of the body.

* * * * *